United States Patent [19]
Shibuya et al.

[11] Patent Number: 5,604,578
[45] Date of Patent: Feb. 18, 1997

[54] COLOR IMAGE FORMING APPARATUS HAVING A FUNCTION OF DETERMINING A CHARGE VALUE CHARGED ON A CUSTOMER ACCORDING TO AN AMOUNT OF RECORDING MATERIAL

[75] Inventors: Kunihiro Shibuya, Kawasaki; Hiroki Kanno, Yokohama, both of Japan

[73] Assignee: Kabushiki Kaisha Toshiba, Kanagawa-ken, Japan

[21] Appl. No.: 576,065

[22] Filed: Dec. 21, 1995

[30] Foreign Application Priority Data

Dec. 27, 1994 [JP] Japan .................................. 6-325564

[51] Int. Cl.[6] .................................................. G03G 15/01
[52] U.S. Cl. .............................. 399/178; 377/14; 399/50; 399/54; 399/197
[58] Field of Search ............................. 355/326 R, 327, 355/245, 202, 200, 308; 377/13–16

[56] References Cited

U.S. PATENT DOCUMENTS

| | | | |
|---|---|---|---|
| 5,373,349 | 12/1994 | Ito | 355/202 |
| 5,383,129 | 1/1995 | Farrell | 377/15 X |
| 5,506,661 | 4/1996 | Hanzawa | 355/311 X |

*Primary Examiner*—R. L. Moses
*Attorney, Agent, or Firm*—Limbach & Limbach

[57] ABSTRACT

An image forming apparatus includes a reading section for fetching first color image data subjected to color separation, a circuit for converting the first color image data into second color image data, a unit for forming a duplicate image of the first color image data by using recording materials of different types based on the second color image data, a unit for calculating the consumptions of the recording materials used for image formation in the image forming unit, and a unit for calculating a charge value for image formation based on the consumption.

28 Claims, 22 Drawing Sheets

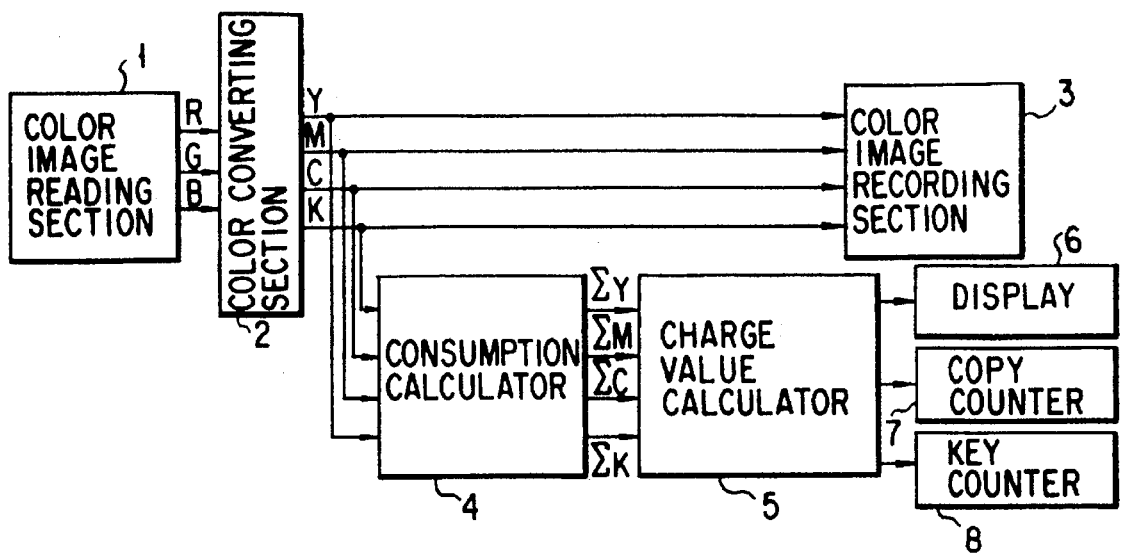
F I G. 1
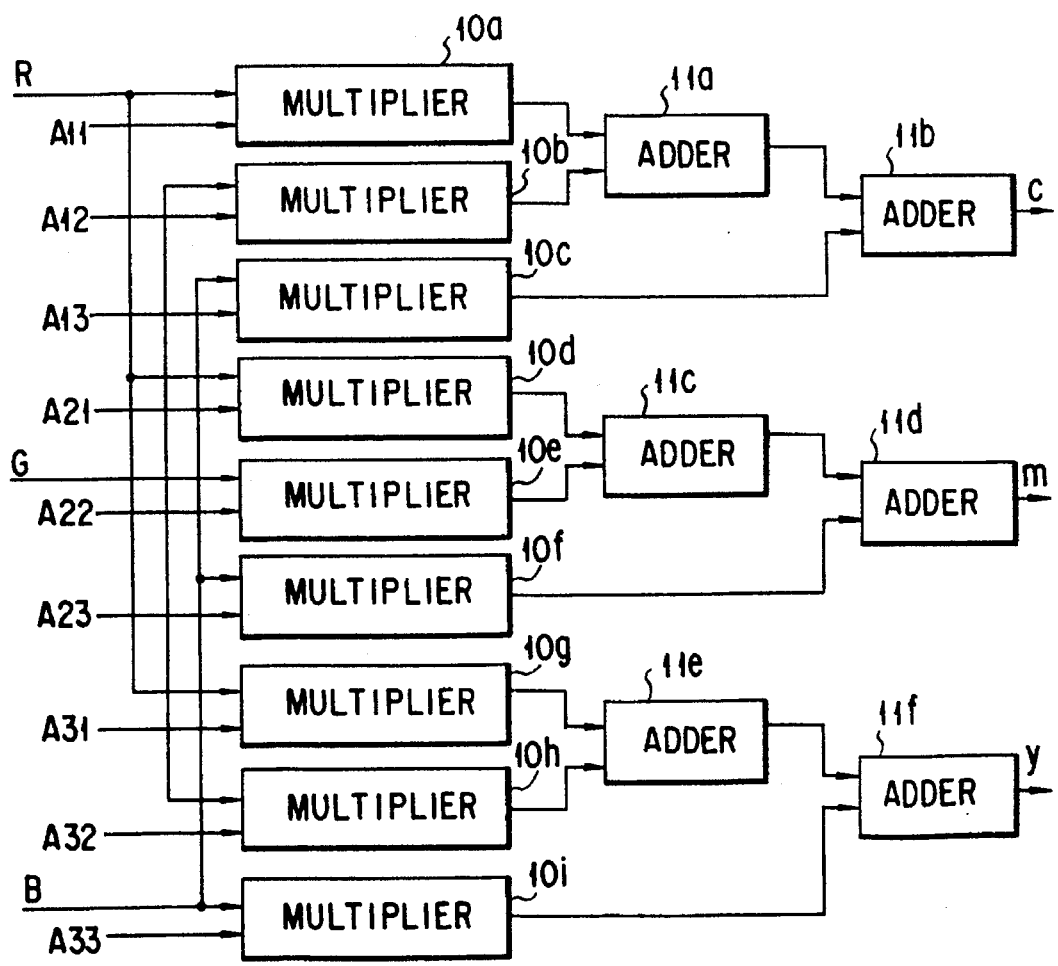
F I G. 2

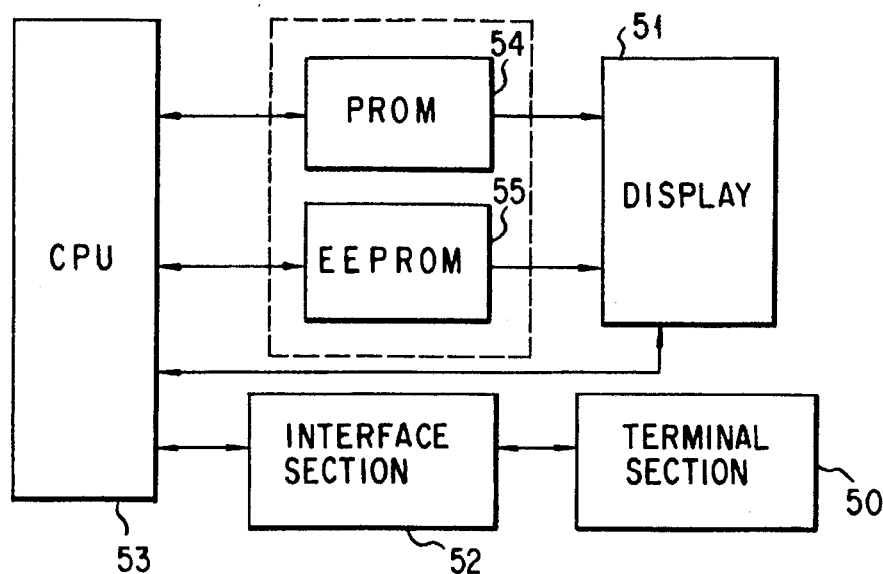
F I G. 10
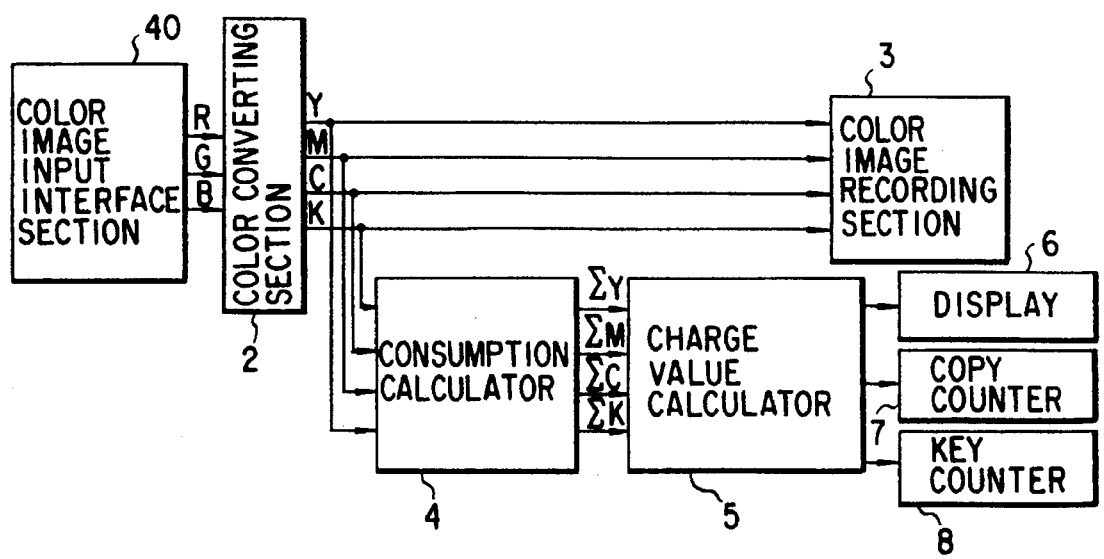
F I G. 16

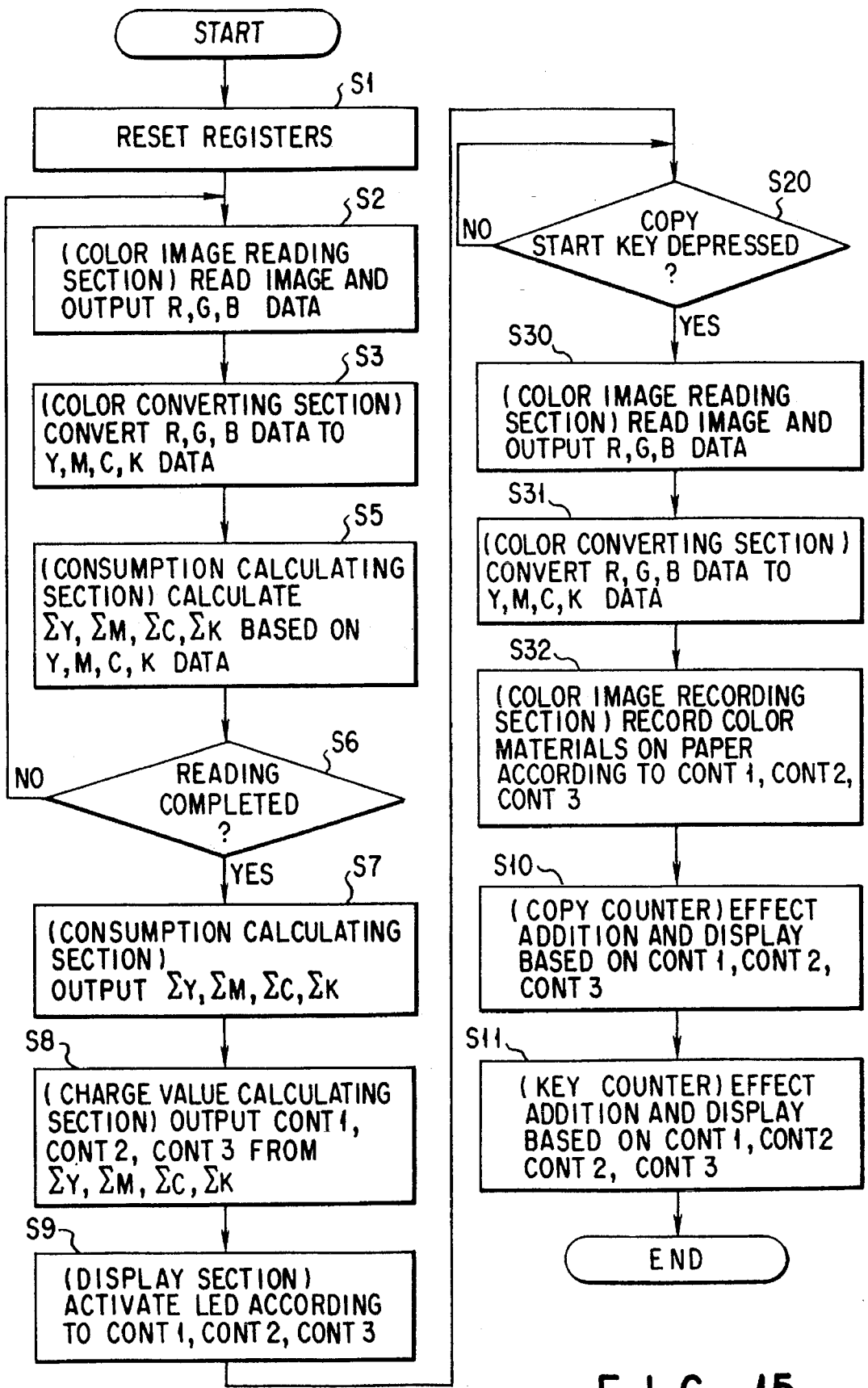
F I G. 15

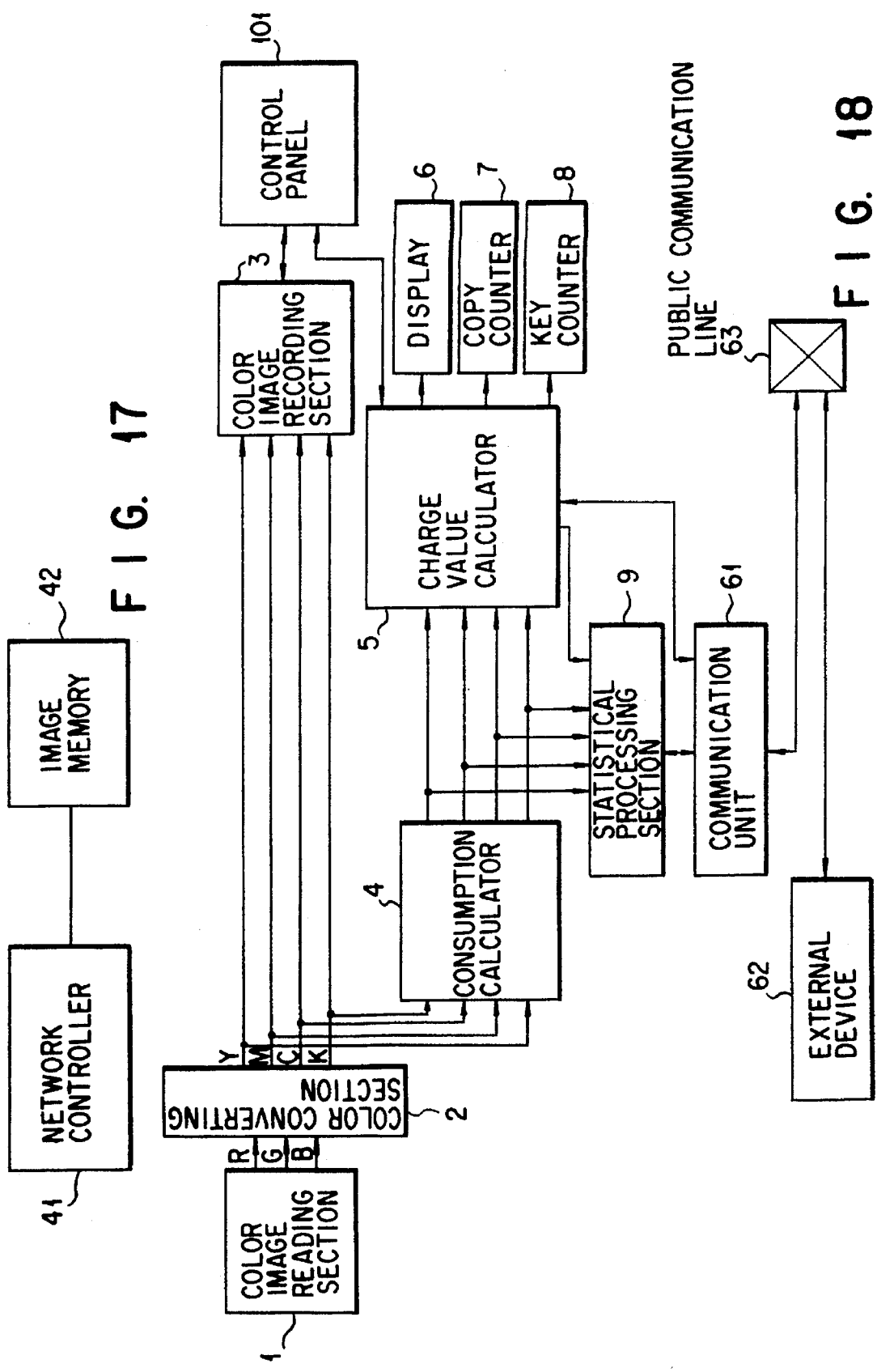

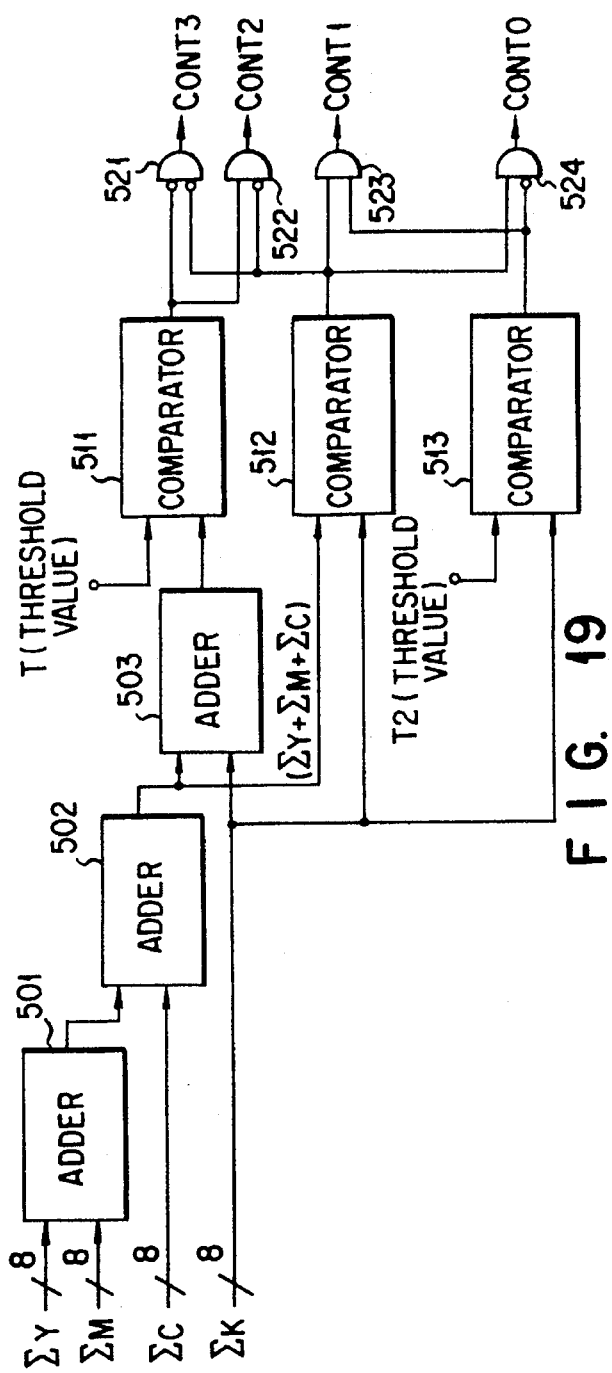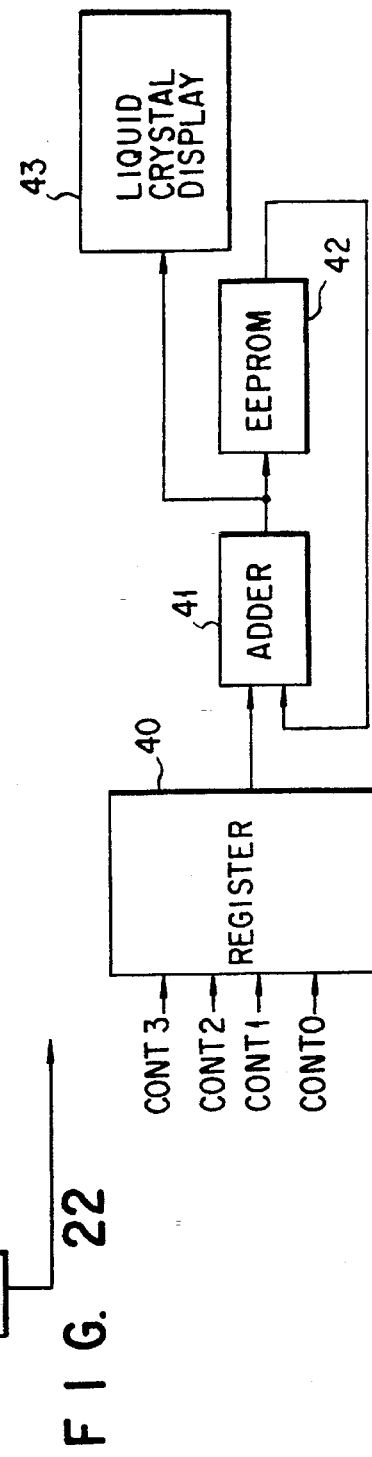

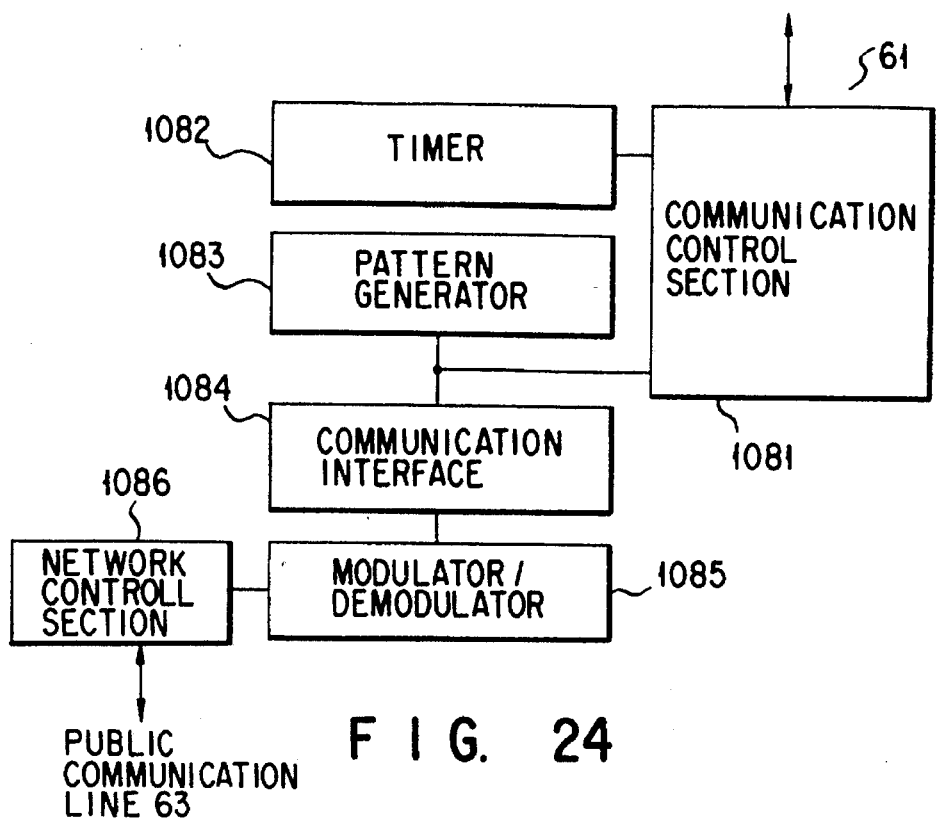
F I G. 24
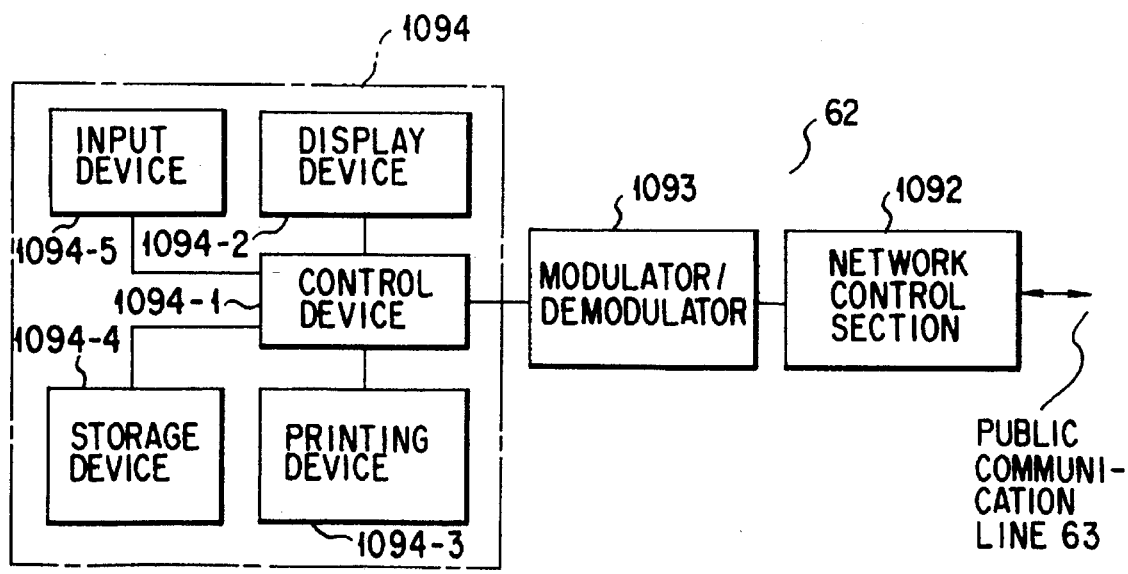
F I G. 25

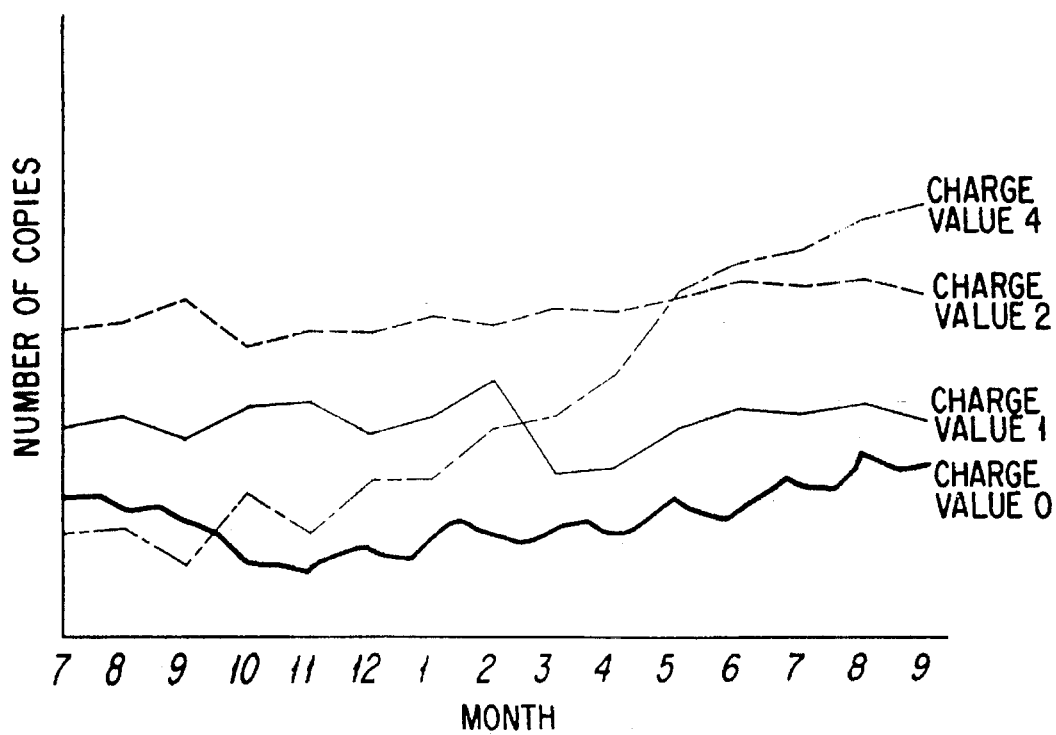
F I G. 27
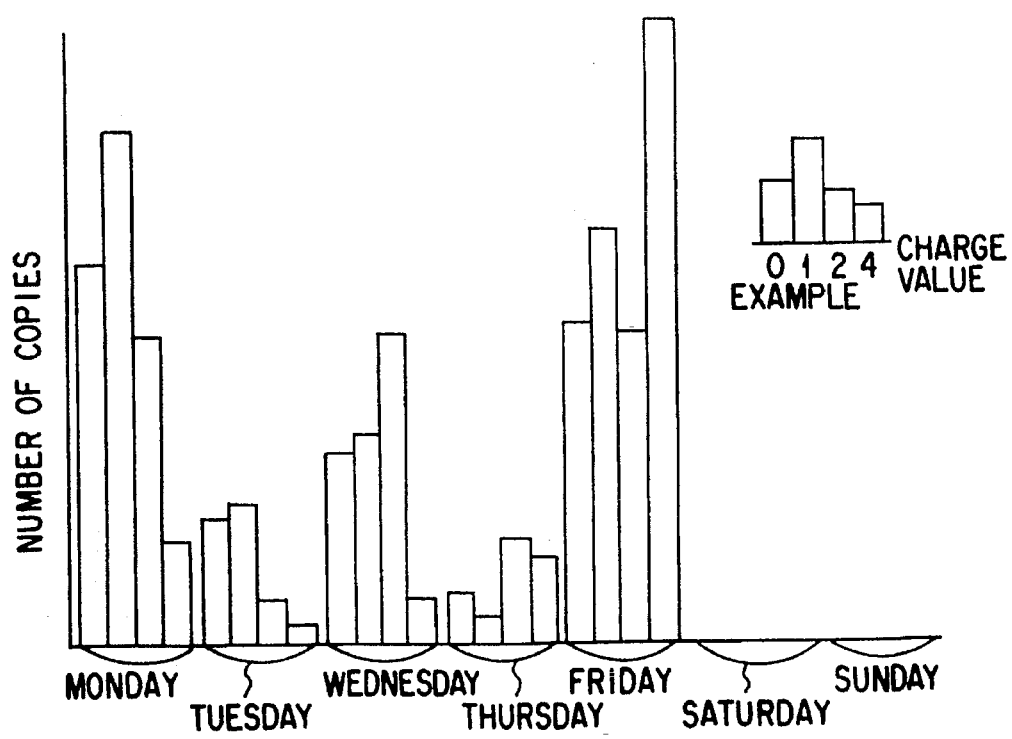
F I G. 28

| DATA NUMBER | TIME INFORMATION | ΣY | ΣM | ΣC | ΣK | CHARGE VALUE |
|---|---|---|---|---|---|---|
| ⋮ | ⋮ | ⋮ | ⋮ | ⋮ | ⋮ | ⋮ |
| 128 | 95/09/29/17/35/09 | 0 | 0 | 0 | 120 | 1 |
| 129 | 95/09/30/09/15/42 | 80 | 20 | 30 | 70 | 2 |
| 130 | 95/09/30/09/15/45 | 80 | 20 | 30 | 70 | 2 |
| 131 | 95/09/30/10/05/11 | 180 | 70 | 90 | 60 | 4 |
| 132 | 95/09/30/16/54/57 | 100 | 60 | 40 | 30 | 4 |
| 133 | 95/10/02/11/28/31 | 0 | 0 | 0 | 60 | 1 |
| ⋮ | ⋮ | ⋮ | ⋮ | ⋮ | ⋮ | ⋮ |

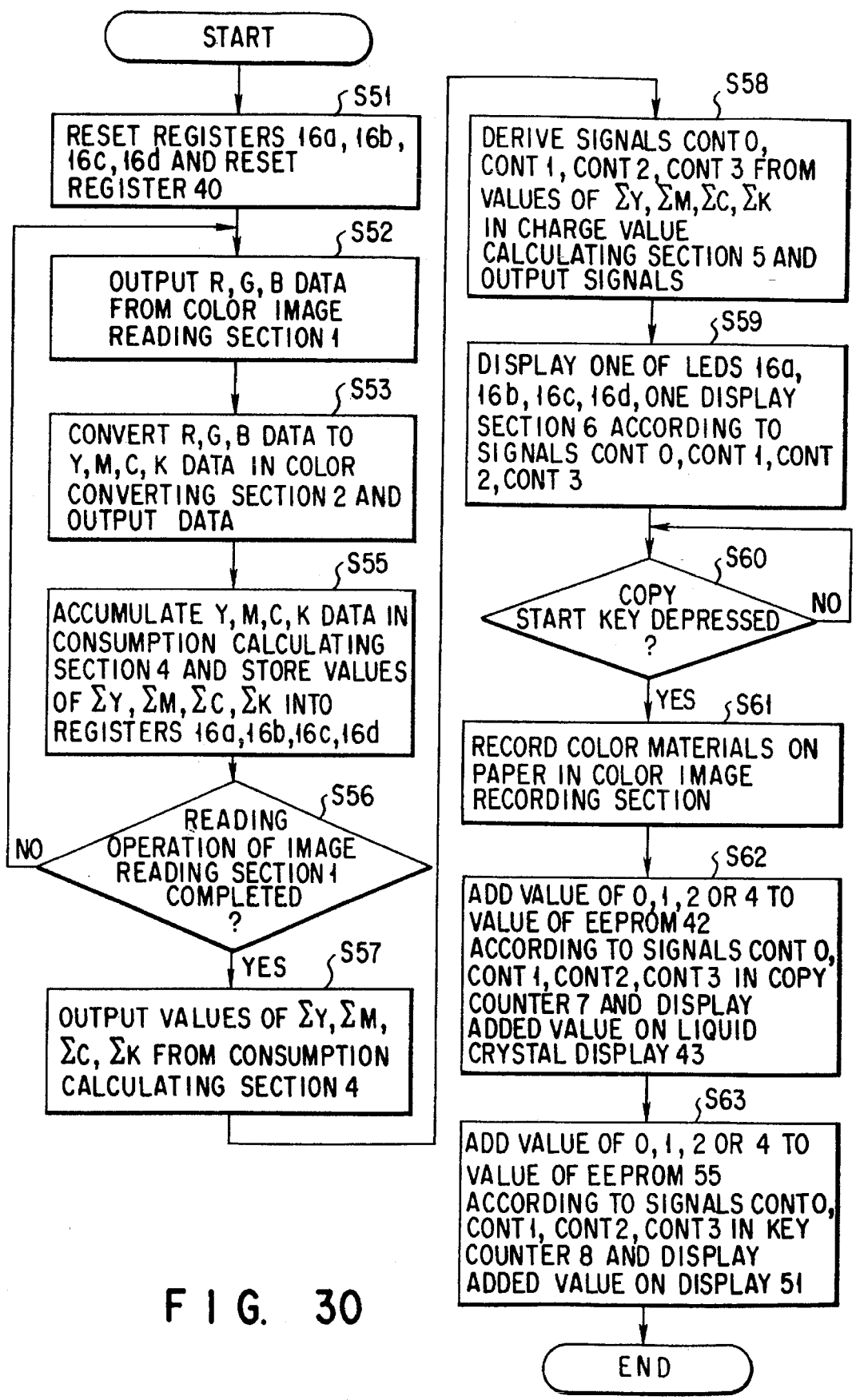
F I G. 30

|  | MONOCHROME (0) | MONOCHROME (1) | COLOR LINE DRAWING (2) | FULL COLOR (3) |
|---|---|---|---|---|
| PAPER | a | a | a | a |
| PHOTOSENSITIVE BODY AND THE LIKE | b | b | 4b | 4b |
| TONER | c | 2c | 4c | 20c |
| SERVICE LABOR COST | d | d | d | d |
| MARGIN | e | e | e | e |
| CHARGE VALUE | a+b+c+d+e | a+b+2c+d+e | a+4b+4c+d+e | a+4b+20c+d+e |

F I G. 36

|  | MONOCHROME (0) | MONOCHROME (1) | COLOR LINE DRAWING (2) | FULL COLOR (3) |
|---|---|---|---|---|
| PAPER | a | a | a | a |
| PHOTOSENSITIVE BODY AND THE LIKE | 4b | 4b | 4b | 4b |
| TONER | c | 2c | 4c | 20c |
| SERVICE LABOR COST | d | d | d | d |
| MARGIN | e | e | e | e |
| CHARGE VALUE | a+4b+c+d+e | a+4b+2c+d+e | a+4b+4c+d+e | a+4b+20c+d+e |

F I G. 37

COLOR IMAGE FORMING APPARATUS HAVING A FUNCTION OF DETERMINING A CHARGE VALUE CHARGED ON A CUSTOMER ACCORDING TO AN AMOUNT OF RECORDING MATERIAL

BACKGROUND OF THE INVENTION

1. Field of the Invention

This invention relates to an image forming apparatus such as a color copying machine for forming a duplicate image of a color image, for example.

2. Description of the Related Art

Generally, color originals are roughly divided into three types depending on the printing rate. The three types are photographs and printed matters represented by natural pictures having a printing rate of 50% or more, presentation materials mainly including graphs and diagrams and having a printing rate of a few ten %, and general documents mainly including letters and tables and having a printing rate of approx. 10%.

Conventionally, only the photographs and printed matters are obtained as color originals at hand, but now, with the advent of color personal computers and color printers, presentation materials are presented in a colored form, and color printing is started to be used to represent the letter emphasis and ruled lines owing to a reduction in the cost of the above color OA instruments. Therefore, the printing rate of color originals is rapidly reduced.

Among color copying machines for copying color originals, an electrophotographic type becomes dominant because of the operation speed is high and the number of sheets to be copied for each minute can be recorded. In this case, a charge amount charged on the user is determined by the price for one sheet and is independent of the degree of the printing rate. This is because the electrophotographic copying machine has been widely used to deal with monochromatic letter originals having a low printing rate (several %), the service life of the optical semiconductor drum which is a consumable part is short and the cost thereof occupies a large part of the running cost, and the charge amount is not so much dependent on the amount of toner consumption. Further, the color copying machine dealing with color originals has substantially a high printing rate and the running cost thereof is set to a value several ten times that of the monochromatic copying machine since the total demand for color toner is little.

Thus, in the color copying machine of electrophotographic type having a sufficiently high performance as a color copying machine and having a high recording speed, the copying charge for one sheet is set at a preset price for both of a color original having a high printing rate and a color original having a low printing rate irrespective of the printing rate of the color original. Therefore, in a case where a color original having a low printing rate is copied, a charge amount higher than the actual running cost may be set and charged on the user.

Further, like the monochromatic copying machine, in the color copying machine, the service maintenance is effected at regular intervals, or for every preset number of copying sheets. The color copying machine uses toners of four colors and the image forming process includes four stages, but the frequencies at which the toners are used become greatly different according to the type of original and the type of original is different for each user, and as a result, the amounts of toners tend to become short or excessive if the service maintenance is always equally effected. Therefore, there occurs a problem that useless or insufficient maintenance is effected.

Further, there occurs a problem that even if the record of usage of the recording material by a plurality of users is stored in a memory or the like, the record of usage cannot be used as the maintenance guide, for example, if it is not adequately modified.

SUMMARY OF THE INVENTION

An object of this invention is to provide an image forming apparatus having a high recording speed and capable of setting different prices for users according to the printing rate.

This invention provides an image forming apparatus comprising means for fetching color image data subjected to color separation; means for forming a duplicate image of the color image data by using recording materials of different types based on the color image data; means for calculating the consumptions of the respective recording materials used for image formation in the image forming means; and means for calculating a charge value for image formation of the duplicate image of the color image data based on the consumptions of the recording materials calculated by the consumption calculating means.

Unlike the conventional case wherein a preset charge which is unconditionally determined irrespective of the type of duplicate image formed is charged on the customer, this invention provides an image forming apparatus constructed with the above construction to finely set the charge. That is, since the consumption of recording materials used is calculated at each time of image formation and the charge is set stepwise based on the consumption of recording materials, an adequate charge can be set even when, for example, a substantially monochromatic original image which requires an extremely small amount of recording material in comparison with the full color printing image using sufficiently large amounts of respective color materials is copied.

Further, this invention provides an image forming apparatus comprising means for fetching color image data subjected to color separation; means for forming a duplicate image of the color image data by using recording materials of different types based on the color image data; means for calculating the consumptions of the respective recording materials used for image formation in the image forming means; means for calculating a charge value for image formation of the duplicate image of the color image data based on the consumptions of the recording materials calculated by the consumption calculating means; means for outputting statistical data obtained by subjecting the calculated charge value to the statistical process; and means for supplying the statistical data to an external device.

This invention provides an image forming apparatus constructed with the above construction to not only adequately set the charge on the customer but also supply statistical data based on the consumptions of the respective recording materials so as to rationalize the operation such as maintenance by using the statistical data.

That is, with the above construction, the consumption of the recording materials is recorded and statistical data is derived by the statistical process based on the consumption. Then, by supplying the statistical data to an external device such as a personal computer or data base, the operator can get information relating to the degree of consumption of the recording materials for each month, for example, from the personal computer or the like at the time of maintenance, for example. Thus, it becomes possible to improve the maintenance service such as the operation of replacing recording materials which has been always equally effected in the prior art and attain the efficient and rational operation depending on the degree of actual consumption of the recording materials.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram schematically showing the construction of an image forming apparatus according to a first embodiment of this invention;

FIG. 2 is a block diagram schematically showing the construction of an electrical main section provided at the preceding stage of a color converting section;

FIG. 10 is a block diagram schematically showing the construction of an electrical main section of the key counter;

FIG. 15 is a flowchart for illustrating the operation process of a color image forming apparatus according to a third embodiment of this invention;

FIG. 16 is a block diagram schematically showing the construction of a color image forming apparatus according to a fourth embodiment of this invention;

FIG. 17 is a block diagram schematically showing the construction of a color image input interface in the fourth embodiment of this invention;

FIG. 18 is a block diagram schematically showing the construction of an image forming apparatus according to a fifth embodiment of this invention;

FIG. 19 is a block diagram schematically showing the construction of a charge value calculating section;

FIG. 21 is a block diagram schematically showing the construction of an electrical main section of a copy counter in the fifth embodiment;

FIG. 22 is a block diagram schematically showing the construction of a register of the copy counter in the fifth embodiment;

FIG. 24 is a block diagram showing the construction of a communication unit;

FIG. 25 is a block diagram showing the construction of an external device;

FIG. 27 is a graph showing a first output example of the external device;

FIG. 28 is a graph showing a second output example of the external device;

FIG. 30 is a flowchart for illustrating the operation of a modification of one embodiment of this invention;

FIG. 36 is a table showing a charge value obtained when a 4-rotation type color image forming apparatus of this invention; and FIG. 37 is a table showing a charge value obtained when a 4-series type color image forming apparatus of this invention.

DETAILED DESCRIPTION OF THE PREFERRED EMBODIMENTS

Figures 3, 4:
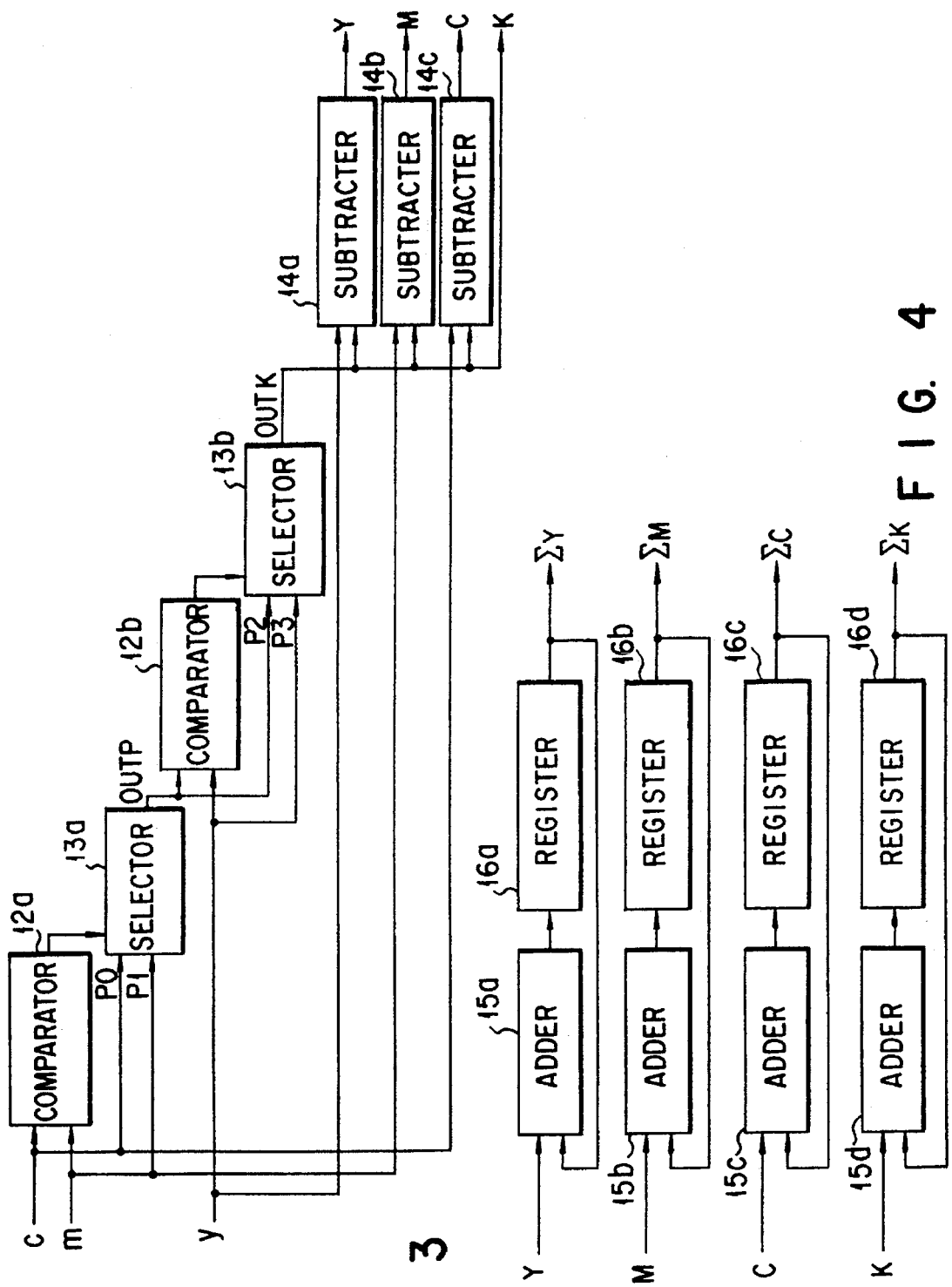
FIG. 3 is a block diagram schematically showing the construction of an electrical main section provided at the succeeding stage of a color converting section.
FIG. 4 is a block diagram schematically showing the construction of an electrical main section of a consumption calculating section.

There will now be described embodiments of this invention with reference to the accompanying drawings.

FIG. 1 schematically shows the construction of an image forming apparatus according to a first embodiment of this invention. A color image reading section 1 is a CCD scanner, for example, and converts light of an object into electrical signals corresponding to three primary colors of light of R (red), G (green) and B (blue) for each of the pixels obtained by dividing a color image used as an original in the vertical and horizontal directions, and outputs them as 8-bit digital data items, that is, first color data items R, G, B for each pixel.

A color converting section 2 converts the 8-bit first color data items for R, G, B input for each pixel into second color data items Y, M, C, K which are each constructed by 8-bit data and respectively correspond to the amounts of color materials (recording materials) of Y (yellow), M (magenta), C (cyan) which are primary three colors of ink and K (black) and outputs the second color data.

A color image recording section 3 attaches color materials of YMCK of amounts corresponding to the second color data items Y, M, C, K to paper to make and output a hard copy.

The second color data items Y, M, C, K are supplied to a consumption calculating section 4 in which the amount of consumable materials (color materials, that is, ink) used for formation of a color image of one picture plane is derived.

A charge calculating section 5 outputs a charge value (so-called a charge amount charged on the customer) set at one of a plurality of charge levels determined according to the previously determined charge ratios based on the amount of the color materials YMCK used for forming an image of one picture plane.

A display section 6 is a liquid crystal panel or LED (light emitting diode) array disposed on the user's control panel (not shown) of this apparatus to display a charge value.

A copy counter 7 is a combination of a liquid crystal display and a non-volatile memory or a mechanical rotation counter disposed on the control panel or inside the apparatus and increments the count according to the charge value each time one sheet of hard copy is issued by the color image recording section 3.

A key counter 8 is a counter removably mounted on the apparatus and is a combination of a liquid crystal display and a non-volatile memory or a mechanical rotation counter like the copy counter 7, and is mounted on the apparatus to increment the count according to the charge value when a hard copy is output from the color image recording section 3.

Next, the color converting section 2 is explained with reference to FIG. 2.

Generally, a masking equation is used as a method of color correction process for converting three primary colors RGB of light derived from the color image reading section 1, that is, first color image data items R, G, B into three primary color data items y (yellow), m (magenta), c (cyan) of ink for controlling the amounts of color materials of the color recording apparatus. The basic equation is indicated by the following Equation 1.

$$\begin{pmatrix} c \\ m \\ y \end{pmatrix} = \begin{pmatrix} A_{11} & A_{12} & A_{13} \\ A_{21} & A_{22} & A_{23} \\ A_{31} & A_{32} & A_{33} \end{pmatrix} \begin{pmatrix} R \\ G \\ B \end{pmatrix} \qquad \text{[Equation 1]}$$

where y, m, c indicate the magnitudes of electrical signals (which are called color signals y, m, c) of the respective color materials y, m, c obtained as the result of masking, R, G, B indicate the magnitudes of electrical signals of RGB by color separation, and A1J is a coefficient indicating the masking amount. Basically, a masking circuit is constructed based on the Equation 1. One example of the circuit is shown in FIG. 2. The first color data items of RGB are input to multipliers 10a, 10b, 10c and respectively multiplied by coefficients A11, A12, A13.

Next, the results of multiplication in the multipliers 10a, 10b are input to an adder 11a and added together. The result of multiplication in the multiplier 10c and the result of addition in the adder 11a are added together in an adder 11b and the result of addition thereof is output as a color signal c.

Likewise, the first color data items of RGB input to multipliers 10d, 10e, 10f are respectively multiplied by coefficients A21, A22, A23, and the results of multiplication in the multipliers 10d, 10e are added together in an adder 11c, and the result of addition in the adder and the result of multiplication in the multiplier 10f are added together in an adder 11d and a color signal m is output from the adder 11d.

Further, the first color data items of RGB input to multipliers 10g, 10h, 10i are respectively multiplied by coefficients A31, A32, A33, and the results of multiplication in the multipliers 10g, 10h are added together in an adder 11e, and the result of addition in the adder and the result of multiplication in the multiplier 10i are added together in an adder 11f and a color signal y is output from the adder 11f.

In order to suppress the consumption of color materials at the time of color image formation, an under color removal (UCR) process is effected. The principle thereof is briefly explained. Based on the fact that an Indian ink color, that is, black can be obtained when the color materials y, m, c of the same amount are mixed, the minimum amount of the color materials y, m, c is derived and is determined as the consumption of black color material. That is, the second color data K corresponding to the consumption of black color material can be defined by the following equation.

$$K = \text{MIN}(y, m, c) \qquad (1)$$

MIN: functional operation for deriving the minimum value.

The second color data items corresponding to the consumptions of the respective color materials y, m, c can be expressed by the following equations by removing a constant amount of black component derived from the consumptions of the respective color materials according to the equation (1).

$$Y = y - K \qquad (2)$$

$$M = m - K \qquad (3)$$

$$C = c - K \qquad (4)$$

That is, by using the black (K) component, it can be expected that the amount of overlapping color materials will be reduced and the consumptions of the respective color materials will be reduced.

A concrete example of the UCR circuit for effecting the UCR process for reducing the amounts of respective signals by removing a constant amount of black component from the color signals y, m, c is shown in FIG. 3.

As shown in FIG. 3, the magnitude of the color signal c is compared with that of the color signal m in a comparator 12a and a signal indicating the result of comparison (which is "0" when the color signal c is smaller, for example) is output to a selector 13a.

The color signals c and m are input to the input ports P0 and P1 of the selector 13a, and one of the input ports is selected according to a control signal (which is "0" when c is smaller, for example) from the comparator 12a (the input port P0 is selected when c is smaller, for example) to output a corresponding signal. The output result signal OUTP is expressed by the following equation.

$$\text{OUTP}=\text{MIN }(c, m) \tag{5}$$

Likewise, the output signal OUTP and the color signal y are input to a comparator 12b and a control signal indicating the result of comparison is supplied to a selector 13b, and if the output signal OUTP and the color signal y are input to the input ports P2 and P3 of the selector 13b, an output result signal OUTK expressed by the following equation can be derived and thus second color data K which is a digital signal indicating the amount of black component can be obtained.

$$\text{OUTK}=\text{MIN }(y, m, c) \tag{6}$$

Further, the color signal y and a second color signal K are input to a subtracter 14a and second color data Y can be derived by subtracting the signal amount K from the signal amount y. Likewise, second color data M can be derived by subtracting the second color data K from the color signal m in a subtracter 14b, and second color data C can be derived by subtracting the second color data K from the color signal c in a subtracter 14c.

Next, the consumption calculating section 4 is explained with reference to FIG. 4.

The second color data Y is input to an adder 15a together with an output of a register 16a, the values thereof are added together and the result of addition is input to the register 16a. The contents of the registers 16a, 16b, 16c, 16d are cleared to "0" when the color image reading section 1 starts to read a color image of one picture plane. Therefore, in the register 16a, second color data items Y of the image of one picture plane are accumulated and accumulated color data $\Sigma Y$ is output when reading of the color image of one picture plane is terminated.

Likewise, the second color data M is input to an adder 15b together with an output of the register 16b, the values thereof are added together and the result of addition is input to the register 16b. Thus, in the register 16b, second color data items M of the color image of one picture plane are accumulated and accumulated color data $\Sigma M$ is output.

Further, the second color data C is input to an adder 15c together with an output of the register 16c, the values thereof are added together and the result of addition is output to the register 16c. Thus, in the register 16c, second color data items C of the color image of one picture plane are accumulated and accumulated color data $\Sigma C$ is output.

Further, the second color data K is input to an adder 15d together with an output of the register 16d, the values thereof are added together and the result of addition is input to the register 16d. Thus, in the register 16d, second color data items K of the color image of one picture plane are accumulated and accumulated color data $\Sigma K$ is output.

At this time, if the color image recording section 3 makes a hard copy of color image with 400 dpi in an area of A3 size (297 mm×420 mm) and the second color data of one picture plane is 8 bits, then the maximum amount of second color data can be expressed by the following equation (7).

$$8 \text{ (bit)} \times 297 \text{ (mm)} \times 420 \text{ (mm)} \times \{400 \text{ (dot)}/25.4 \text{ (mm)}\}^2 = 2.5t \times 10^8 \tag{7}$$

Therefore, it is sufficient if each of the registers 16a, 16b, 16c, 16d has a capacity of 28 bits.

Next, the charge value calculating section 5 is explained with reference to FIG. 5.

Four data signals of accumulated color data items $\Sigma Y$, $\Sigma M$, $\Sigma C$, $\Sigma K$ from the consumption calculating section 4 are input to the charge value calculating section 5.

The accumulated color data items $\Sigma Y$ and $\Sigma M$ are input to an adder 20a and the result of addition ($\Sigma Y+\Sigma M$) is input to an adder 20b.

In the adder 20b, the above result of addition is added to the accumulated color data item $\Sigma C$ and the result of addition ($\Sigma Y+\Sigma M+\Sigma C$) is input to an adder 20c and comparator 21b.

In the comparator 21b, the input value ($\Sigma Y+\Sigma M+\Sigma C$) is compared with the value of $\Sigma K$ and the result of comparison is output as a signal CONT1. That is, the signal CONT1 is set to "0" when $$\Sigma Y+\Sigma M+\Sigma C \geq \Sigma K \tag{8}$$

and is set to "1" when $$\Sigma Y+\Sigma M+\Sigma C < \Sigma K \tag{9}$$

In this case, if the condition of the expression (9) is satisfied, it can be determined that the color image read by the color image reading section 1 is, for example, an image of a monochromatic original mainly including letters and tables and having the lowest printing rate.

On the other hand, in the adder 20c, the output value ($\Sigma Y+\Sigma M+\Sigma C$) is added to the value of accumulated color data $\Sigma K$ and the result of addition ($\Sigma Y+\Sigma M+\Sigma C+\Sigma K$) is input to a comparator 21a.

A predetermined threshold value T is input to the comparator 21a, and the comparator 21a compares the input value ($\Sigma Y+\Sigma M+\Sigma C+\Sigma K$) with the value of T and outputs the result of comparison to logic circuits 22, 23. That is, the comparator 21a outputs an output signal of "0" when $$\Sigma Y+\Sigma M+\Sigma C+\Sigma K \geq T \tag{10}$$

and outputs an output signal of "1" when $$\Sigma Y+\Sigma M+\Sigma C+\Sigma K < T \tag{11}$$

At this time, in the logic circuit 22, the logical AND of a logically inverted form of the signal CONT1 and a logically inverted form of an output signal from the comparator 21a is derived and output as a signal CONT3. That is, the signal CONT3 is set to "0" when $$\Sigma Y+\Sigma M+\Sigma C \geq \Sigma K, \Sigma Y+\Sigma M+\Sigma C+\Sigma K < T \tag{12}$$

and is set to "1" when $$\Sigma Y+\Sigma M+\Sigma C \geq \Sigma K, \Sigma Y+\Sigma M+\Sigma C+\Sigma K \geq T \tag{13}$$

In this case, if the condition of the expression (13) is satisfied, it can be determined that the color image read by the color image reading section 1 is a full color original such as a photograph or printing matter as is represented by a natural picture having a printing rate of 50% or more.

In the logic circuit 23, the logical AND of a logically inverted form of the signal CONT1 and an output signal from the comparator 21a is derived and output as a signal CONT2. That is, the signal CONT2 is set to "0" when $$\Sigma Y+\Sigma M+\Sigma C \geq \Sigma K, \Sigma Y+\Sigma M+\Sigma C+\Sigma K \geq T \tag{14}$$

and is set to "1" when $$\Sigma Y+\Sigma M+\Sigma C \geq \Sigma K, \Sigma Y+\Sigma M+\Sigma C+\Sigma K < T \tag{15}$$

In this case, if the condition of the expression (15) is satisfied, it can be determined that the color image read by the color image reading section 1 is a line drawing color original mainly including graphs and diagrams and having a printing rate of a few ten %.

Figure 6:
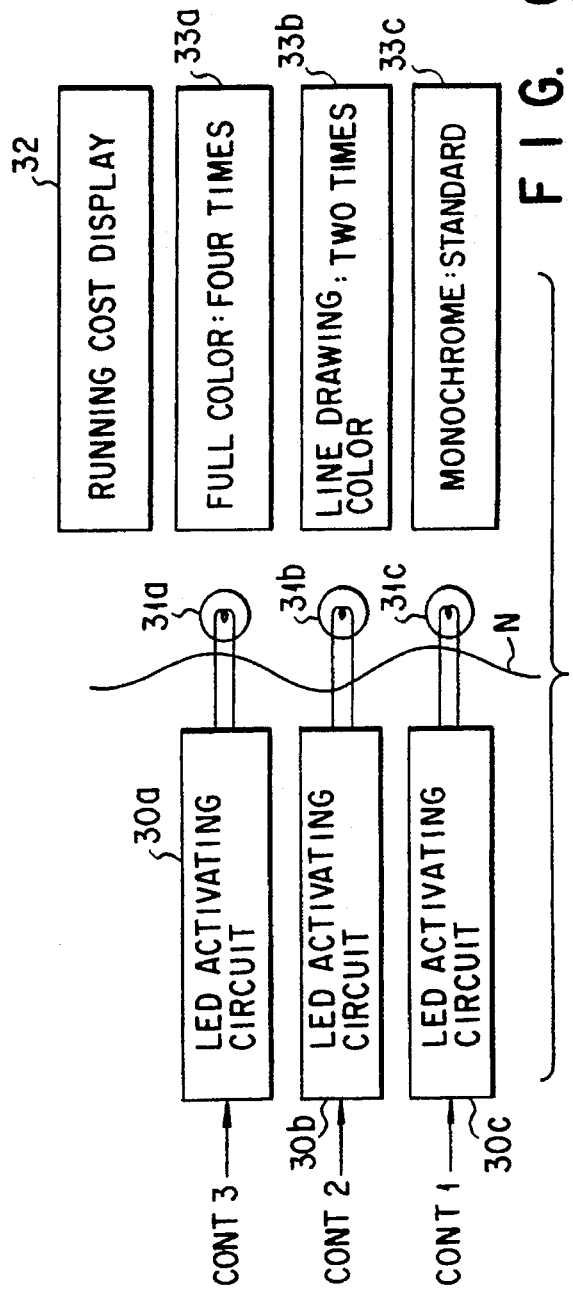
FIG. 6 is a block diagram schematically showing the construction of a display.

Next, the display section 6 is explained. A control panel for permitting the user to input operation instructions is provided on the front portion of the image forming apparatus of this embodiment and the display section 6 shown in FIG. 6 is disposed on part of the control panel.

The display section 6 is supplied with three signals of the signals CONT1, CONT2, CONT3 from the charge value calculating section 5. The respective signals are input to LED activating circuits 30a, 30b, 30c, and only when the input signal is set at the "1" level, a corresponding one of the LED activating circuits activates a corresponding LED (light emitting diode) 31a, 31b or 31c. A portion on the right side of the wave line N indicates the display on the control panel, and stickers 33a, 33b, 33c on which messages indicating the meanings of the lighted states of the LEDs are printed are respectively attached beside the LEDs 31a, 31b, 31c and a sticker 32 is attached on the upper side of the above stickers to clearly show that the running costs are displayed by the LEDs 31a, 31b, 31c.

That is, on the display section 6, information indicating whether a color image read by the color image reading section 1 is a monochromatic original, line drawing color original or full color original is displayed according to the signal CONT1, CONT2, CONT3. Thus, the running cost can be divided into a plurality of ranges (in this example, three ranges) according to the degree of the printing rate.

In this example, the LED display is used, but a display unit using a liquid crystal panel may be used as the display section and the messages of the stickers 33a, 33b, 33c may be displayed in response to the signals CONT1, CONT2, CONT3.

Next, the copy counter 7 is explained. The copy counter 7 is set inside the main body of the image forming apparatus and used by the person in charge of the maintenance of the apparatus.

Figure 7:
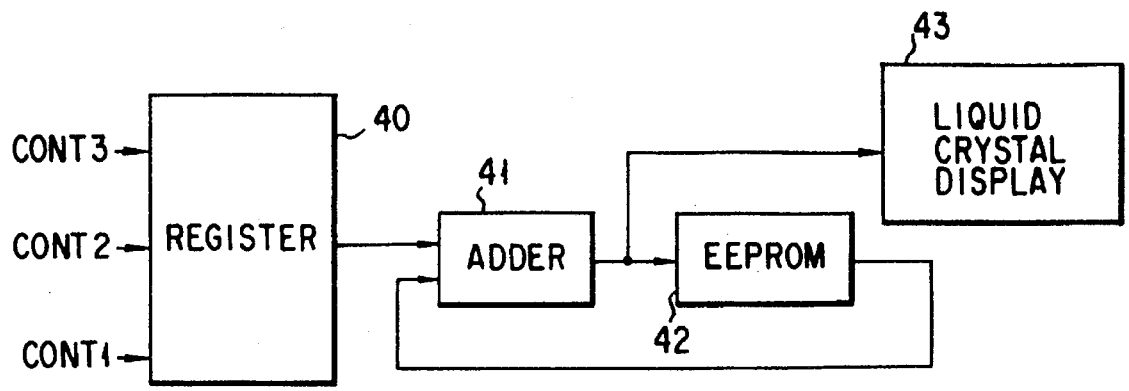
FIG. 7 is a block diagram schematically showing the construction of an electrical main section of a copy counter.

FIG. 7 shows the construction of the copy counter 7. The signals CONT1, CONT2, CONT3 from the charge value calculating section 5 are input to a register 40.

Figure 8:
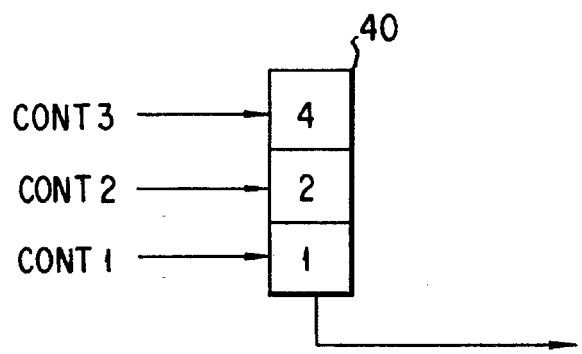
FIG. 8 is a conceptual diagram showing the construction of a register of the copy counter.

The register 40 has a 3-bit configuration as shown in FIG. 8 and the signals CONT1, CONT2, CONT3 are assigned to the high order bit, intermediate order bit and low order bit. For example, when the signal CONT3 is input, "4" is output, when the signal CONT2 is input, "2" is output, and when the signal CONT1 is input, "1" is output.

An output of the register 40 is input to an adder 41 together with a signal read out from an electrically rewritable nonvolatile EEPROM 42 and the signals are added together and stored into the EEPROM 42 as a new accumulated value. The accumulated value is also input to a liquid crystal display 43 and is displayed.

The key counter 8 is explained. As is seen from the appearance shown in FIG. 9, the key counter is constructed in the form of IC card and can be removably set on the apparatus. In a state wherein the key counter 8 is inserted into and set on the main body of the image forming apparatus, the signals CONT1, CONT2, CONT3 from the charge value calculating section 5 of the main body of the apparatus are input to the key counter 8 via a terminal section 50 exposed on the surface of the key counter 8. Further, a display 51 is disposed on the surface of the key counter 8.

FIG. 10 schematically shows the construction of the electrical main portion of the key counter 8.

As shown in FIG. 10, the signals CONT1, CONT2, CONT3 input via the terminal section 50 are input to a CPU 53 via an interface section 52. Further, in a state wherein the key counter 8 is inserted into and set on the main body of the image forming apparatus, the terminal section 50 is also used as a power supply contact to permit the electric power to be supplied to the key counter 8.

The interface section 52 acts as an interface between the main body of the image forming apparatus and the CPU 53.

The CPU 53 reads out a value accumulated up to now and stored in an EEPROM 55, adds a value corresponding to the signal CONT1, CONT2, CONT3 to the accumulated value and writes the accumulated value obtained as the result of addition into the EEPROM 55. At this time, a numeral pattern corresponding to the accumulated value is selected and read out from patterns previously registered in a PROM 54 and displayed on the display 51 of the liquid crystal panel.

In the PROM 54, an operation program of the key counter 8 is stored and the CPU 53 controls the whole operation of the key counter 8 according to the program.

In this example, no power source is provided on the key counter 8, but a battery may be provided on the key counter 8, and as is explained in the case of the copy counter 7, a mechanical rotation type counter can be substituted to display the accumulated value.

Figure 11:
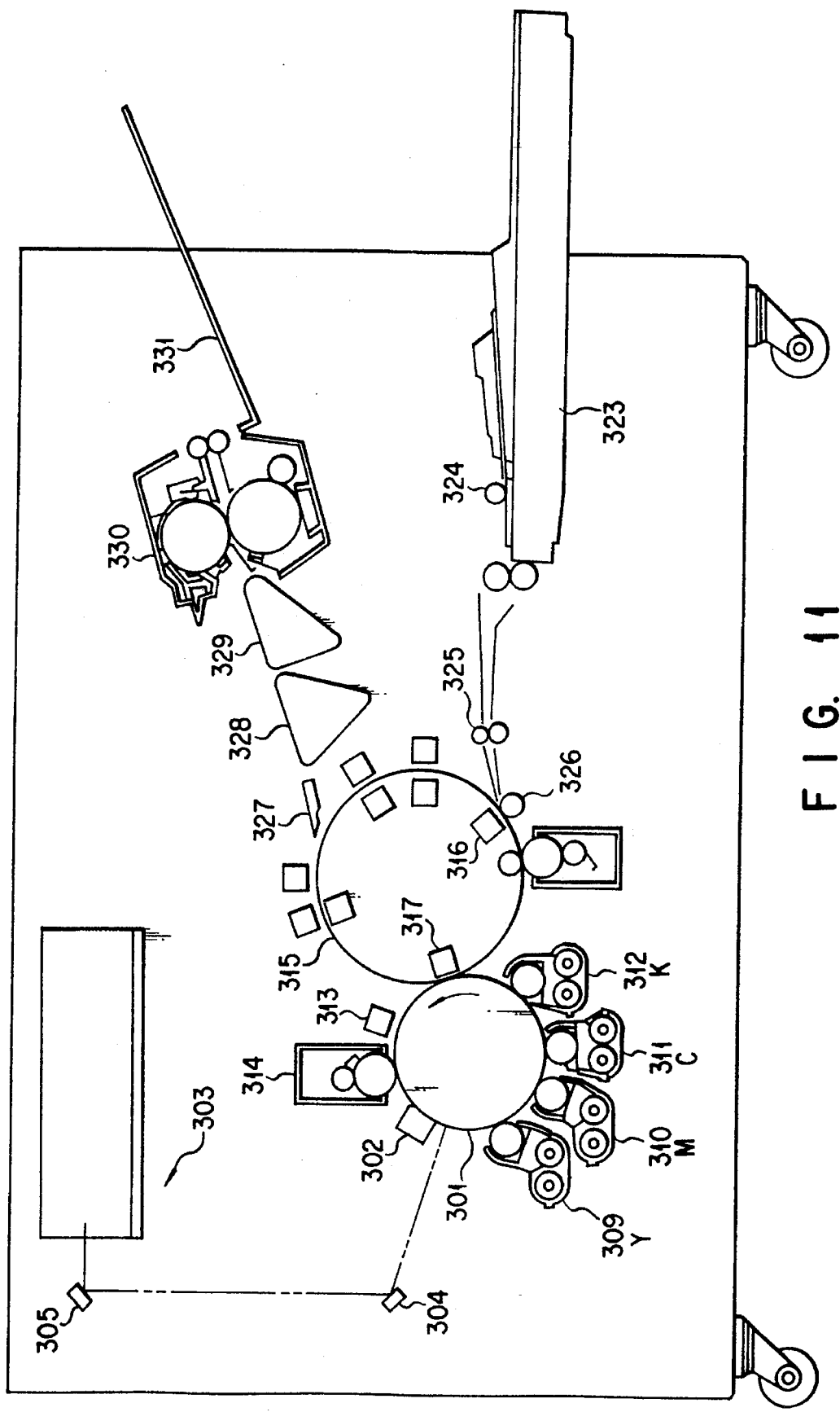
FIG. 11 is a construction view showing a 4-rotation type color image forming apparatus according to one embodiment of this invention.

FIG. 11 is a view showing a full color recording apparatus according to this invention.

As shown in FIG. 11, a photosensitive drum 301 is provided as an image carrier and rotates in a counterclockwise direction.

A charging unit 302, first developing unit 309, second developing unit 310, third developing unit 311, fourth developing unit 312, pre-cleaning discharging unit 313, photosensitive cleaner 314, and image transfer material holding body 315 are arranged around the photosensitive drum 301.

As shown in FIG. 11, an exposing section 303 including a polygon mirror 307 for scanning laser beams from semiconductor lasers (laser diodes) 345, 346, a polygon motor 308 for driving the polygon mirror 307, a half-mirror 347, a lens (not shown) and mirrors 304, 305 is provided between the charging unit 302 and the first developing unit 309.

The developing units 309 to 312 develop (visualize) an electrostatic latent image on the photosensitive drum 301 by use of different toners (developing powders) of four colors, and the first developing unit 309 contains magenta toner, the second developing unit 310 contains cyan toner, the third developing unit 311 contains toner of yellow toner, and the fourth developing unit 309 contains black toner, for example.

The photosensitive drum 301 uniformly charged on the surface thereof by the charging unit 302 is exposed to light scanned according to image data by the exposing section 303 and an electrostatic latent image is formed on the photosensitive drum. The electrostatic latent image is developed according to the image data by the developing units 309 to 312 and then transferred onto paper used as an image transferring material electrostatically attached to a transfer drum 315 by the transfer charging unit 17.

Non-transferred toner left behind on the photosensitive drum 301 is discharged by the precleaning discharging unit 313 and then cleaned by the photosensitive cleaner 314.

On the other hand, the paper is supplied from a cassette 323 by a paper supply roller 324 and the position thereof is arranged by a resist roller 325. Then, the paper is fed to an attracting roller 326 and attracting charging unit 316 disposed in position corresponding to the attached position of the transfer drum 315 by the resist roller 325 and electrostatically attracted onto the transfer drum 315 by the attracting charging unit 316.

After this, the developing process and transfer process are repeatedly effected four times at maximum if the transfer, charging, multi-color printing operation is effected in position facing the photosensitive drum 301 as described before.

The paper having toner transferred thereon is separated from the transfer drum 315 by a separating section 327 and then discharged on a tray 331 via conveyer belts 328, 329 and fixing unit 330.

Figure 12:
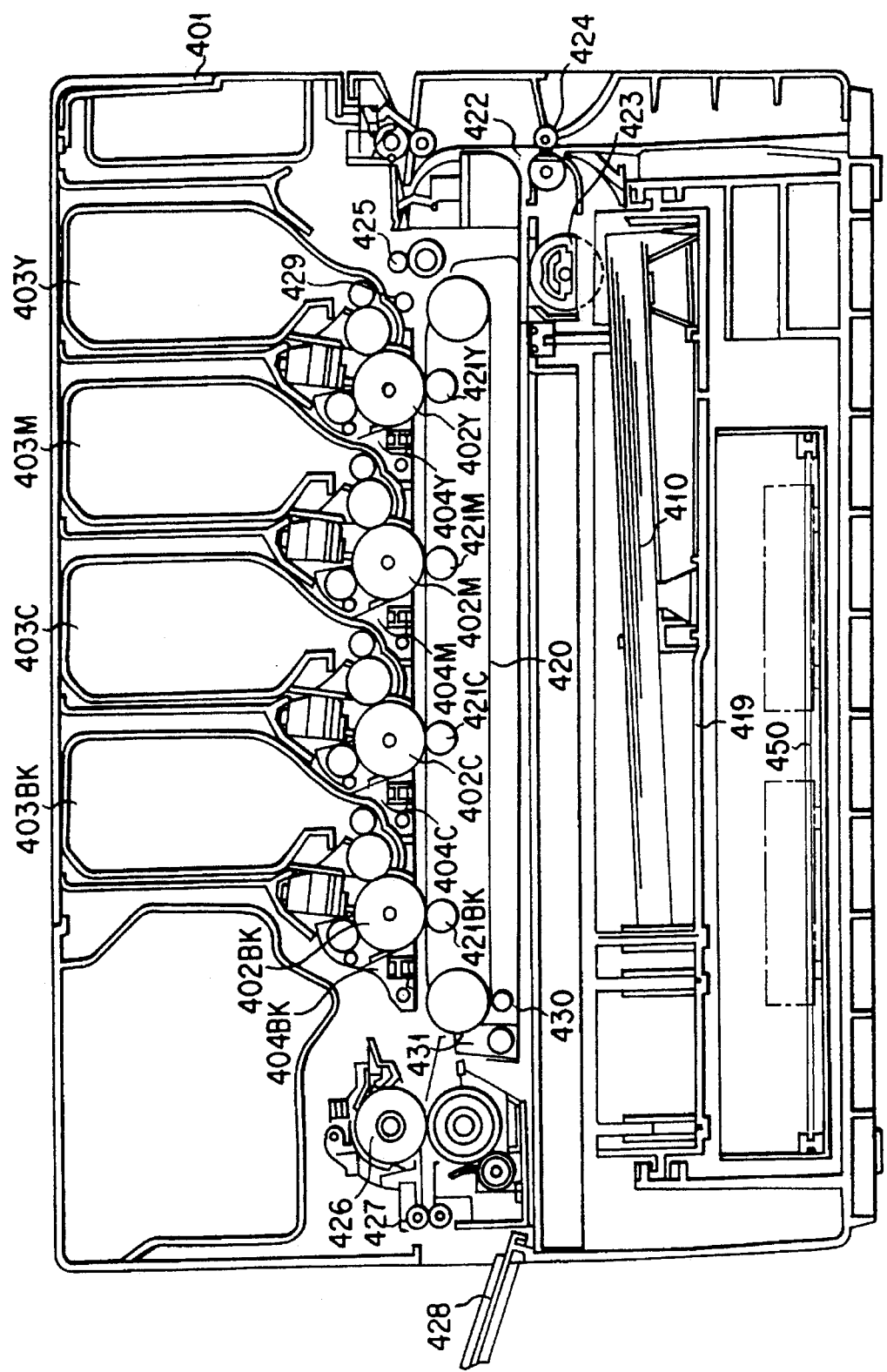
FIG. 12 is a construction view showing a 4-series type color image forming apparatus according to one embodiment of this invention.

FIG. 12 is a view showing a full color recording apparatus according to this invention.

As shown in FIG. 12, in a main body 401 of the apparatus, recording devices 403Y, 403M, 403C, 403BK for recording images of four colors of yellow (Y), magenta (M), cyan (C) and black (BK) are arranged in parallel to photosensitive drums 402Y, 402M, 402C, 402BK used as image carriers. Since the recording devices 403Y, 403M, 403C, 403BK are formed with the same structure, only the recording device 403Y arranged in the first stage is explained, and portions of the other recording devices 403M, 403C, 403BK which are the same as those of the recording device 403Y are denoted by the same reference numerals with corresponding symbols indicating the corresponding colors and the explanation for the other recording devices 403M, 403C, 403BK is omitted.

The recording device 403Y has a photosensitive drum 402Y, and image forming means 404Y disposed corresponding in position to the photosensitive drum 402Y to repeatedly form a yellow image on the photosensitive drum 402Y. The image forming means 404Y includes a charging unit 405Y, exposing unit 406Y, developing unit 407Y, cleaning unit 408Y, discharging unit 409Y and the like.

Below the arrangement position of the recording devices 403Y, 403M, 403C, 403BK, a transfer conveyer belt 420 used as transfer material carrying means is stretched to carry a transfer material 410 such as paper to the photosensitive drums 402Y, 402M, 402C, 402BK.

Further, transfer devices 421Y, 421M, 421C, 421BK used as transfer means are arranged in positions opposite to the photosensitive drums 402Y, 402M, 402C, 402BK with the transfer conveyer belt 420 disposed therebetween so as to transfer toner images of respective colors formed on the photosensitive drums 402Y, 402M, 402C, 402BK onto the transfer material 410 carried by the conveyer belt 420. The transfer material 410 is supplied to the conveyer belt 420 at a controlled timing by a paper supply unit 422.

As shown in FIG. 12, the paper supply unit 422 includes a pickup roller 423 for taking up the transfer material 410 from a paper supply cassette 419, a feeding roller pair 424 for feeding the transfer material 410 taken up by the pickup roller 423, and a resist roller pair 425 for adjusting the position of the front end of the transfer material 410 fed by the feeding roller pair 424 and feeding the same at a controlled timing.

The feeding speed of the transfer material 410 fed by the resist roller pair 425 and transfer conveyer belt 420 is set to a speed equal to the peripheral speed of the photosensitive drums 402Y, 402M, 402C, 402BK.

Further, a fixing unit 426, paper discharging roller pair 427 and paper discharging tray 428 are sequentially arranged in the transfer material carrying direction (to the right in the drawing) by the transfer conveyer belt 420 and a control unit 50 for controlling the operations of the recording devices 403Y, 403M, 403C, 403BK, paper supply unit 422 and other devices is provided on the inner bottom portion of the main body 401 of the apparatus.

If an instruction of color image formation is issued from an operation input section (not shown), the recording devices 403Y, 403M, 403C, 403BK of yellow (Y), magenta (M), cyan (C), black (BK) are operated at preset timings to form toner images of respective colors on the photosensitive drums 402Y, 402M, 402C, 402BK.

That is, in the recording device 403Y taken as an example, the photosensitive drum 402Y is rotated in a clockwise direction (in the direction indicated by an arrow A) in the drawing and the surface of the photosensitive drum is uniformly charged by the charging unit 405Y. Then, the surface of the photosensitive drum 402Y uniformly charged is subjected to the exposing process by the exposing unit 406Y to form a latent image corresponding to the yellow image. The latent image is developed by setting the latent image to face the developing unit 407Y and supplying toner to the latent image and thus a yellow toner image is formed on the photosensitive drum 402Y.

Also, in the other recording devices 403M, 403C, 403BK, toner images are formed in the same manner as described above.

On the other hand, in synchronism with the toner image forming operation, the transfer material 410 is taken up from the paper supply cassette 419, and after the front end of the transfer material is adjusted by the resist roller pair 425, the transfer material 410 is fed onto the transfer conveyer belt 420.

The transfer material 410 fed onto the transfer conveyer belt 420 is fed along the transfer conveyer belt 420 while it is electrostatically attracted to the transfer conveyer belt 420 by the attracting roller 429 used as the attracting means and is first fed to the yellow toner image transfer position, that is, a position in which the transfer conveyer belt 420 is disposed between the photosensitive drum 402Y and the transfer device 421Y.

In the yellow toner image forming position, the transfer material 410 is set into contact with the yellow toner image on the photosensitive drum 402Y and the yellow toner image on the photosensitive drum 402Y is transferred to the transfer material 410 by the action of the transfer device 421Y.

The transfer device 421Y is constructed by a transfer roller having a semiconductive property and creates an electric field of polarity opposite to the potential of the yellow toner image electrostatically attached to the photosensitive drum 402Y from the rear side of the conveyer belt 420. The electric field acts on the yellow toner image formed on the photosensitive drum 402Y via the conveyer belt 420 and transfer material 410, and as a result, the yellow toner image is transferred from the photosensitive drum 402Y to the transfer material 410.

The transfer material 410 to which the yellow toner image is thus transferred is sequentially fed to the toner image transferring positions of the magenta recording device 403M, cyan recording device 403C, and black recording device 403BK and a magenta toner image, cyan toner image and black toner image are sequentially transferred to the transfer material to form a color image thereon.

The transfer material 410 on which the color toner image is formed is next separated from the transfer conveyer belt 420 and fed to the fixing unit 426, and after the color-overlapped color toner image is permanently fixed, the transfer material is discharged to the paper discharging tray 428 via the paper discharging roller pair 427.

On the other hand, the transfer conveyer belt 420 from which the transfer material is separated is continuously driven, remaining toner and paper powder are cleaned by the belt cleaning unit 431, and then the surface potential is made constant by the discharging roller 430.

Further, the photosensitive drums 402Y, 402M, 402C, 402BK from which the toner images are transferred are continuously rotated, remaining toner and paper powder are cleaned by the cleaning devices 408Y, 408M, 408C, 408BK and then the surface potential is made constant by the discharging lamps of the discharging devices 409Y, 409M, 409C, 409BK. After this, a sequence of processes are started by the charging devices 405Y, 405M, 405C, 405BK again as required.

The operation process of the image forming apparatus with the construction described above according to the first embodiment is explained with reference to the flowchart shown in FIG. 13.

When an original is set on the color image reading section 1 and a copy operation starting switch (not shown) is depressed, the registers 16a to 16d of FIG. 4 and the register 40 of FIG. 8 are first reset and the values held therein are all reset to "0" (S1).

Next, 8-bit digital signals of first color data items R, G, B of a certain unit pixel are input to the color converting section 2 from the color image reading section 1 (S2).

As shown in FIG. 2, in the color converting section 2, 8-bit data items of the second color data items R, G, B are converted into 8-bit data items of the color signals c, m, y, and as shown in FIG. 3, they are in turn converted into 8-bit data items of the second color data items Y, M, C, K which are output to the color image recording section 3 and consumption calculating section 4 (S3).

In the color image recording section 3, one color image dot is formed on the recording medium such as paper based on the 8-bit data items of the second color data items Y, M, C, K (S4).

On the other hand, as shown in FIG. 4, the 8-bit data items of the second color data items Y, M, C, K supplied to the consumption calculating section 4 are respectively added to the values held in the registers 16a, 16b, 16c, 16d by the adders 15a, 15b, 15c, 15d and the results of addition are stored into the registers 16a, 16b, 16c, 16d (S5).

The above operation is effected for all of the unit pixels output from the color image reading section 1, and the process is repeatedly returned to the step S2 and the process of the steps S3 to S5 is effected for 8-bit data items of the respective first color data items R, G, B of a next unit pixel until the operation of the image reading device for reading the image of one picture plane of A3 size, for example, is completed (S6).

If the operation of reading the image of one picture plane by the color image reading section is completed, accumulated color data items $\Sigma Y$, $\Sigma M$, $\Sigma C$, $\Sigma K$ are output from the consumption calculating section 4 to the charge value calculating section 5 (S7).

Figure 5:
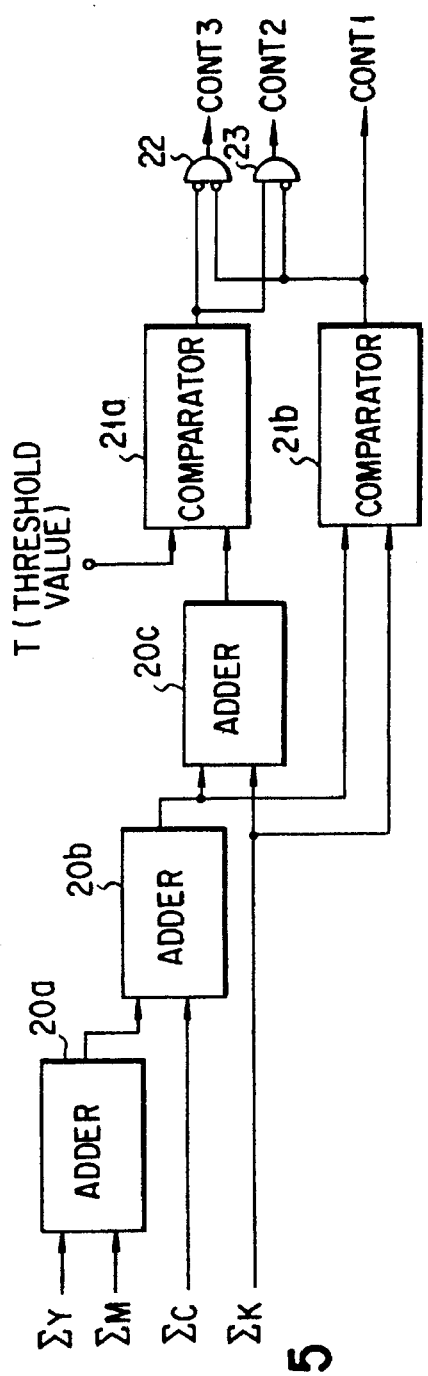
FIG. 5 is a block diagram schematically showing the construction of an electrical main section of a charge value calculating section.

As shown in FIG. 5, in the charge value calculating section 5, the values of the accumulated data items $\Sigma Y$, $\Sigma M$, $\Sigma C$, $\Sigma K$ are sequentially added together by the adders 20a, 20b, 20c, the result of addition ($\Sigma Y+\Sigma M+\Sigma C$) is compared with the value of K by the comparator 21b, the result of addition ($\Sigma Y+\Sigma M+\Sigma C+\Sigma K$) is compared with the threshold value T by the comparator 21a, the results of comparison are logically processed by the logic circuits 22, 23, and then signals CONT1, CONT2, CONT3 are output. If the types of originals are expressed by the values of the signals CONT1, CONT2, CONT3, the following three different cases are provided in this embodiment.

A) In the case of a monochromatic original or an original which contains little color and is similar to a monochromatic original, ($\Sigma Y+\Sigma M+\Sigma C$)<$\Sigma K$, and as a result, CONT1=1, CONT2=0, and CONT3=0.

B) In the case of a color original which has various colors but mainly contains line patterns and letters having small recording areas, ($\Sigma Y+\Sigma M+\Sigma C$)$\geq \Sigma K$ and ($\Sigma Y+\Sigma M+\Sigma C$)<T, and as a result, CONT1=0, CONT2=1, and CONT3=0.

C) In the case of a full color original such as a natural picture which has various colors and has a large recording area, ($\Sigma Y+\Sigma M+\Sigma C$)$\geq \Sigma K$ and ($\Sigma Y+\Sigma M+\Sigma C$)$\geq$T, and as a result, CONT1=0, CONT2=0, and CONT3=1.

The signals CONT1, CONT2, CONT3 are output from the charge value calculating section 5 to the display section 6 disposed on the user's control panel (not shown), the copy counter 7 set inside the main body of the image forming apparatus, and the key counter 8 mounted on the main body of the image forming apparatus by the user when it is used (S8).

When the signals CONT1, CONT2, CONT3 are input to the display section 6, the LED activating circuits 30a, 30b, 30c are driven as shown in FIG. 6 and one of the LEDs 31a, 31b, 31c corresponding to the signals CONT1, CONT2, CONT3 is activated. On the side portion of the LED group, the label 32 of "running cost display", the label 33a of "full color:four times", the label 33b of "line drawing color:two times" and the label 33c of "monochrome:standard" are attached, and the LED 31a to which the label 33a of "full color:four times" is attached is activated in the case of C), the LED 31b to which the label 33b of "line drawing color: two times" is attached is activated in the case of B) and the LED 31c to which the label 33c of "monochrome: standard" is attached is activated in the case of A) so as to indicate to the user that an original set on the image reading section 1 corresponds to the type indicated by the message and a corresponding charge is charged on the user (S9).

In the copy counter 7, the signals CONT1, CONT2, CONT3 are input to the register 40, and one of charge values "4", "2", "1" corresponding to the cases A), B), C) is output. The charge value is added to the charge value accumulated so far and stored in the EEPROM 42 by the adder 41, and the result of addition is stored as an updated value. Further, the value stored in the EEPROM 42 is displayed on the liquid crystal display 43 so that the person in charge of maintenance or the like can visually confirm the charge value when he demands the payment from the user (S10).

On the other hand, in the key counter 8, according to the program stored in the PROM 54, the CPU 53 fetches the signals CONT1, CONT2, CONT3 from the charge value calculating section via the terminal section 50 and interface section 52, adds the value thereof to the value already stored in the EEPROM 55, and stores the result of addition into the EEPROM 55. Further, the stored value is displayed on the display 51 (S11).

The embodiment described above can be modified without departing from the technical scope thereof. For example, it is possible to indicate the charge value to the user before starting the operation of the color image recording section 3 to form a hard copy and then start the hard copy forming operation after obtaining the user's consent, and this enhances the added value of the apparatus. The above case is explained with reference to the following second and third embodiments.

Figure 13:
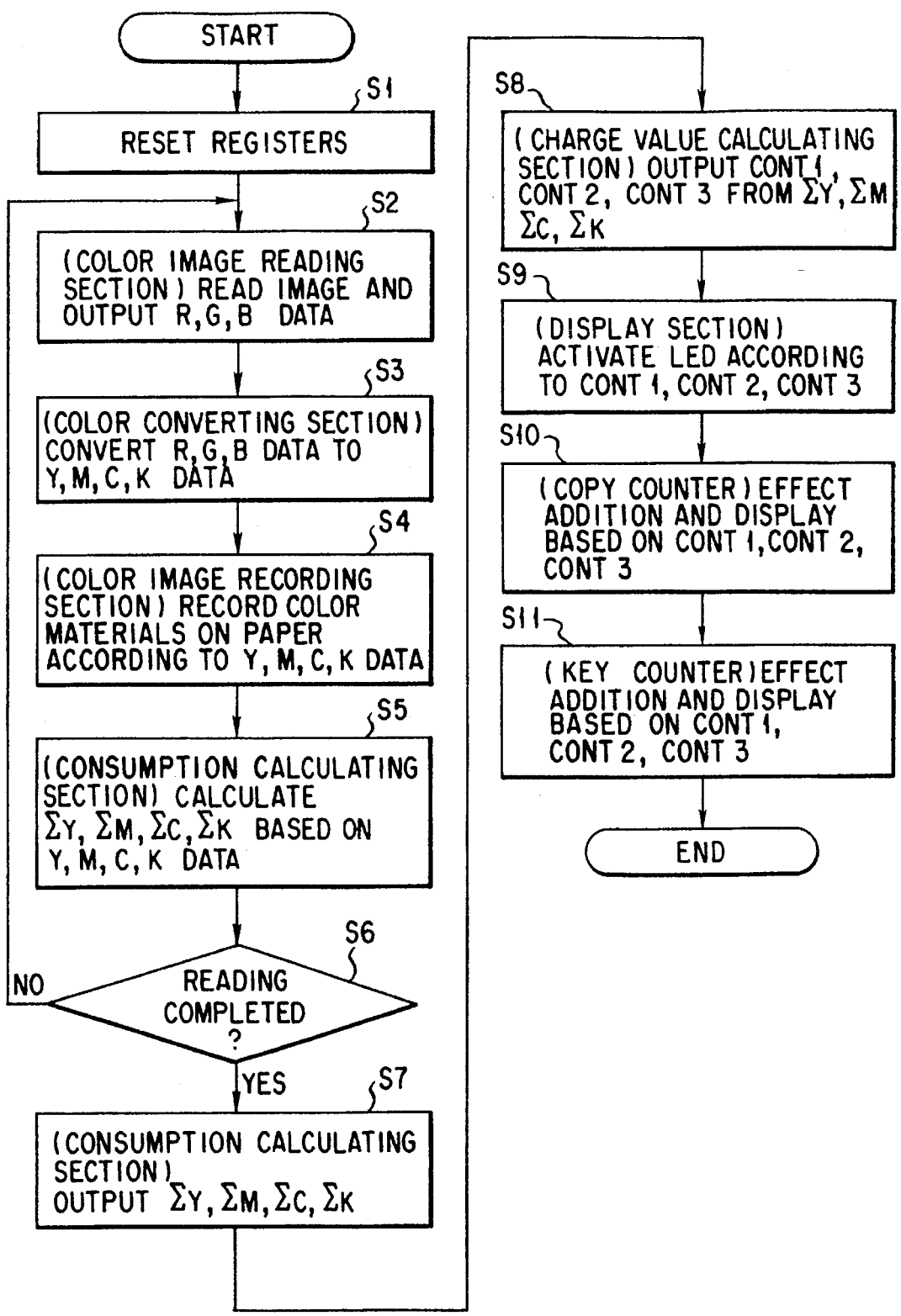
FIG. 13 is a flowchart for illustrating the operation process of a color image forming apparatus according to a first embodiment of this invention.
Figure 14:
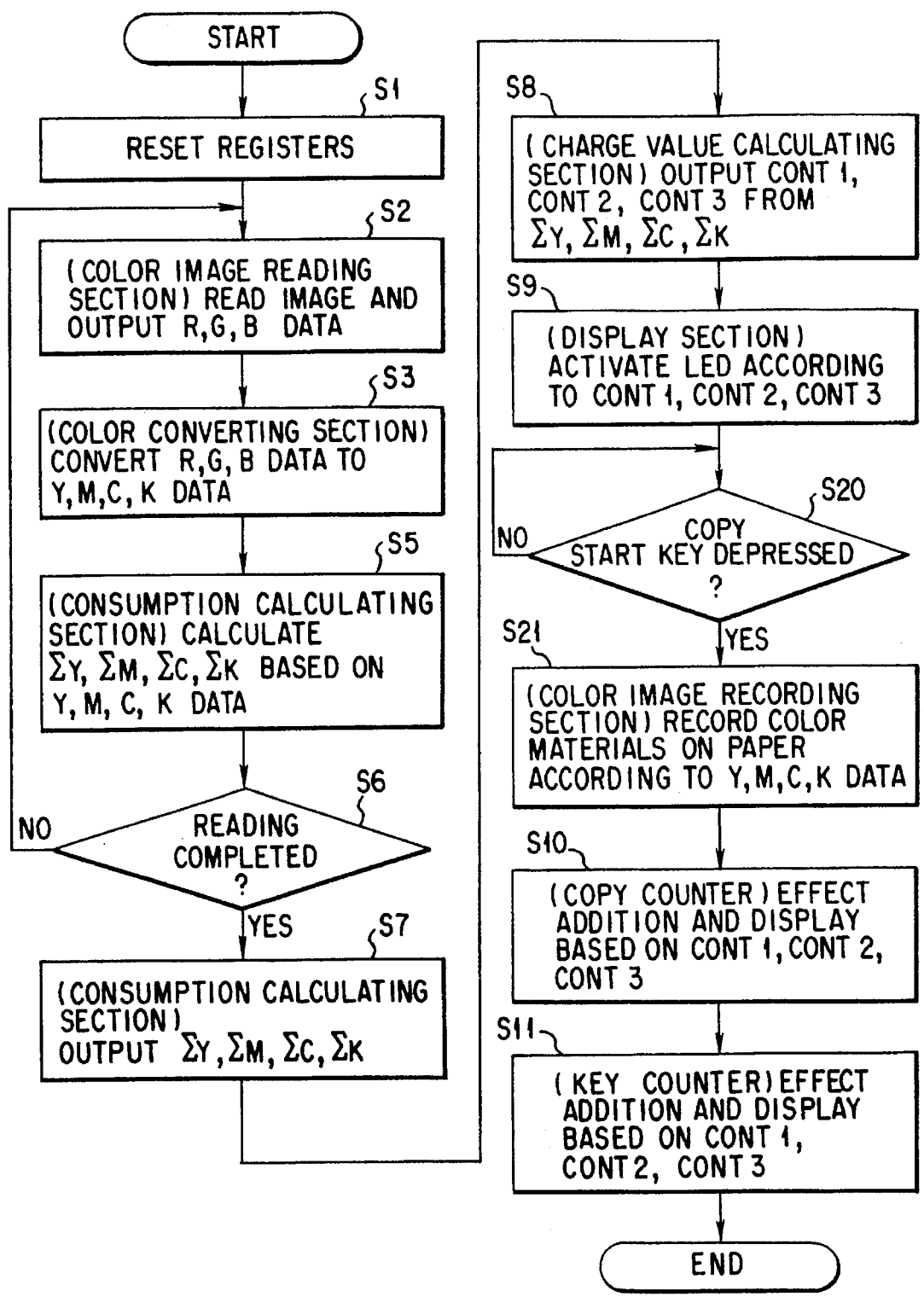
FIG. 14 is a flowchart for illustrating the operation process of a color image forming apparatus according to a second embodiment of this invention.

First, the operating process of the image forming apparatus is explained as the second embodiment with reference to the flowchart shown in FIG. 14. In this case, those steps which are the same as those in FIG. 13 are denoted by the same reference symbols and only different steps are explained. Specifically, the step S4 of FIG. 13 is omitted and steps S20 and S21 are inserted between the steps S9 and S10.

In the first embodiment of FIG. 13, the recording operation (S4) in the color image recording section 3 is effected when the values of the accumulated color data items $\Sigma Y$, $\Sigma M$, $\Sigma C$, $\Sigma K$ are calculated for each pixel, but in the second embodiment of FIG. 14, after the calculation for the accumulated color data items ΣY, ΣM, ΣC, ΣK is completed (S6, S7), the charge value is calculated (S8), and the LED indicating the charge value is lit on the display section 6 on the control panel (S9), then the operation of detecting that the copy start key is depressed by the user is added, and the recording step (S21) is effected after detection of the key depression (S20).

Thus, it becomes possible to indicate the charge value to the user before the hard copy outputting operation is started and then start the outputting operation after obtaining the user's consent.

At this time, by providing means (for example, ROM) for accumulating the second color data items Y, M, C, K in the color image recording section 3, it becomes possible to accumulate the second color data of one picture plane in the color image recording section 3 when the second color data items Y, M, C, K are output in the step S3, and in the step S21, a hard copy can be made based on the second color data accumulated in the accumulating means.

Further, the accumulating means can be provided in the color converting section 2, and in this case, if it is detected in the step S20 that the copy start key is depressed, the second color data accumulated in the accumulating means in the color converting section 2 is supplied to the color image recording section 3 so as to make a hard copy by the color image recording section 3 in the step S21.

Further, it is possible to provide means for accumulating the first color data items R, G, B in the color converting section 2. In this case, when the first color data R, G, B is output to the color converting section 2 in the step S2, the first color data of one picture plane is accumulated in the color converting section 2. If it is detected in the step S20 that the copy start key is depressed, the first color data accumulated in the accumulating means of the color converting section 2 is converted to the second color data and supplied to the color image recording section 3 so as to make a hard copy in the color image recording section 3.

When comparing a case wherein the first color data accumulating means is provided in the color converting section 2 with a case wherein the second color data accumulating means is provided in the color converting section 2 of color image recording section 3, it is understood that the capacity of the accumulating means can be made small since the data amount of the first color data is less than that of the second color data.

Unlike the former case, if the first color data or second color data accumulating means cannot be provided, the operation process as illustrated by the flowchart shown in FIG. 15 may be effected.

Next, the operation process of the image forming apparatus is explained as the third embodiment with reference to the flowchart shown in FIG. 15. In this case, steps which are the same as those in FIG. 14 are denoted by the same reference symbols and only different steps are explained. Specifically, the step S21 of FIG. 14 is replaced by the steps S30 to S32.

If it is detected in the step S20 that the copy start key is depressed, the color image reading section 1 reads an original set thereon and outputs first color data (S30), the first color data is converted to second color data in the color converting section 2 (S31), and a hard copy is made in the color image recording section 3 according to the second color data (S32).

In this case, the image reading operation (S2) effected at the time of calculation of the charge value in the steps S1 to S9 substantially corresponds to the pre-scanning operation without outputting an image (hard copy). Further, since a hard copy can be made in the color image recording section 3 substantially at the same time as depression of the copy start key, no particular problem occurs in the response time.

In the explanation of the first to third embodiments, the charge value is set to the fixed rate of 1, 2, 4 for the respective cases of A), B), C), but it is possible to freely set the charge value and the practical setting method which may be easily accepted by the user can be selectively used.

For example, in the recording operation effected by using a 4-series process type electrophotographic system having four sets of image forming means each constructed by a photosensitive body, developing unit and the like as the color image recording section 3, it is considered that only the consumption of color toners which are color materials increases, and the consumption of toners for line drawing color recording is set to twice that for monochromatic recording and the consumption of toners for full color recording is set to ten times that for monochromatic recording, and the cost is determined by the basic copying cost for (paper+photosensitive body and the like)+consumption of color materials. Specifically, if the basic charge value for paper used for copying an monochromatic original in the case of electrophotographic system is set to a, the basic charge value for the photosensitive body and the like is set to b, and the basic charge value for the consumption of color materials is set to c, then the total cost may be derived as follows.

In the case of A):
paper $a$+photosensitive body and the like $4b$+consumption of color materials $c=a+4b+c$.

In the case of B):
paper $a$+photosensitive body and the like $4b$+consumption of color materials $2c=a+4b+2c$.

In the case of C):
paper $a$+photosensitive body and the like $4b$+consumption of color materials $10c=a+4b+10c$.

For example, in the recording operation effected by using an electrophotographic system for forming one color image by rotating one photosensitive body four times as the color image recording section 3, the consumption of the photosensitive body for copying an monochromatic original is small, and therefore, the cost is determined by the basic copying cost for (paper)+monochrome/color difference cost+consumption of color materials. Specifically, the total cost may be derived as follows.

In the case of A):
paper $a$+photosensitive body and the like $b$+consumption of color materials $c=a+b+c$.

In the case of B):
paper $a$+photosensitive body and the like $4b$+consumption of color materials $2c=a+4b+2c$.

In the case of C):
paper $a$+photosensitive body and the like $4b$+consumption of color materials $10c=a+4b+10c$.

When the above charging system is set, it is only necessary to form the electrical main portion of the display section 6 and copy counter 7 on the control panel with the same construction as the key counter 8 shown in FIG. 10, previously write the above charge calculating equations and the values of a, b, c into the PROM 5, and calculate the charge value by use of the CPU 53.

In the explanation of the first to third embodiments, the values of the second color data items for all of the pixels input to the adders 15a to 15d are accumulated to derive the accumulated color data items in the consumption calculating section 4. However, this is not limitative, and instead of successively inputting the second data items for all of the pixels to the adders 15a to 15d, accumulated color data items ΣY, ΣM, ΣC, ΣK which cause no problem from the statistical viewpoint can be obtained by inputting the second data items once for every n pixels to reduce the amount of data items to 1/n times the original data amount and multiplying the outputs of the registers 16a to 16d by n instead of successively inputting the second data items for all of the pixels to the adders 15a to 15d. This method is used to alleviate the processing speed and achieve the same purpose by the software process by use of the CPU. The value of n may be set to 8, 16, for example.

Next, the fourth embodiment is explained. FIG. 16 schematically shows the construction of an image forming apparatus according to the fourth embodiment, and portions which are the same as those of FIG. 1 are denoted by the same reference numerals and only different portions are explained. That is, the color image reading section 1 of FIG. 1 is replaced by a color image input interface section 40.

In FIG. 16, a color image interface input section 45 is constructed by a network controller 41 and an image memory 42 shown in FIG. 17 and receives color image data transmitted from a color FAX or a network such as a LAN at the network controller, subjects the received color image data to a preset conversion process and the like in the network controller, and then accumulates the thus processed color image data into the image memory 42.

The color image data may be constructed by three primary colors RGB of light, L*, a*, b* of uniform color space, or XYZ of chromaticity representation. Particularly, if it is constructed by binary error diffusion data for effecting the representation of concentration by partially covering a pixel with a dot of uniform concentration, the capacity of the image memory 42 can be suppressed to minimum and it is preferable.

The color converting section 2 converts three sets of color image data items from the color image input interface section 40 to second data items Y, M, C, K via color signals c. m. y. That is, RGB on the right side of the Equation 1 is first replaced by the three sets of color image data items and then matrix coefficients A11 to A33 may be selected. The other construction is the same as a corresponding portion of the first embodiment.

As described above, according to the first to fourth embodiments, a color original set on the color image reading section 1 is read by the color image reading section 1 to output first color data items R, G, B, the first color data items are converted to second color data items Y, M, C, K corresponding to color components of the actual recording materials in the color converting section 2, the consumptions of the respective recording materials of the color image of one plane are calculated based on the second color data by the consumption calculating section 4 to output the consumptions as accumulated color data, an original is classified into a monochromatic original, line drawing color original or full color original based on the consumption of the respective color materials corresponding to the accumulated color data and a charge value is calculated according to the charging rate (1:2:4 according to the printing rate in the first embodiment) based on the classification in the charge value calculating section 5, the charge value is displayed on the display section 6, and the charge value is accumulated in the copy counter 7 also acting as the charging proving means and the key counter 8 to store and display the accumulated value so that a charge amount can be charged according to the consumption (printing rate) of the respective recording materials calculated based on the second color data for the color original set on the color image reading section 1, thereby making it possible to determine the running cost according to the printing rate.

The fifth embodiment of this invention is explained with reference to the accompanying drawings.

FIG. 18 shows the entire construction of the fifth embodiment of this invention. A color image reading section 1 is a color scanner, color camera or the like and converts light of an object into electrical signals corresponding to three primary colors of light of R (red), G (green) and B (blue) for each of the pixels obtained by dividing a color image used as an original in the vertical and horizontal directions, and outputs them as 8-bit digital data items, or first color data items for each pixel. A color converting section 2 converts the first color data items of 8 bits for R, G, B input for each pixel into second color data items Y, M, C, K which are each constructed by 8-bit data and respectively correspond to the amounts of color materials of Y (yellow), M (magenta), C (cyan) which are primary three colors of ink and K (black) and outputs the second color data items. A color image recording section 3 attaches color materials of YMCK of amounts corresponding to the second color data items YMCK of 8-bit data to paper to make and output a hard copy. The second color data items YMCK of 8-bit data are supplied to a consumption calculating section 4 in which the amount of consumable materials used for formation of a color image of one picture plane is derived. A charge calculating section 5 outputs a charge value set at one of a plurality of charge ranges determined according to the previously determined rule based on the amount of the consumable materials for one picture plane of YMCK. A display section 6 is a liquid crystal panel or LED array disposed on the user's control panel of this apparatus to display a charge value. A copy counter 7 is a combination of a display such as a liquid crystal display and a non-volatile memory or a mechanical rotation counter disposed on the control panel or inside the apparatus and increments the count according to the charge value each time one sheet of hard copy is issued by the color image recording section 3. A key counter 8 is a counter removably mounted on the apparatus and is a combination of a display such as a liquid crystal display and a non-volatile memory or a mechanical rotation counter like the copy counter 7, and is mounted on the apparatus to increment the count according to the charge value when a hard copy is output from the color image recording section 3.

Further, the amount of the consumable materials of one picture plane from the consumption calculating section 4 and the charge value from the charge calculating section 5 are held in a statistical processing section 9 and processed into statistical data. A communication unit 61 controls the public communication network to transmit data stored in the statistical processing section 9. An external device 62 receives data from the communication unit and manages the data.

Further, the communication unit 61 is directly connected to the charge value calculating section 5 and receives the parameter of the operation equation for calculation of the charge value, for example, via the public communication line 63 from the external device 62 and changes the parameters. Thus, the method for setting the charge value for each dealer, for each sales store, or each user can be changed from the external device.

First, the color converting section 2 is explained.

Generally, as the color correction processing method for converting data items of three primary colors RGB of light obtained from the color image reading device to data items ymc of three primary colors of ink for controlling the amounts of color materials, the following masking equation is used.

$$|c|=|A_{11}A_{12}A_{13}|\times|R|$$

$$|m|=|A_{21}A_{22}A_{23}|\times|G| \quad (16)$$

$$|y|=|A_{31}A_{32}A_{33}|\times|B|$$

FIG. 2 shows the circuit construction corresponding to the equation (16). RGB data items are input to multipliers 10a, 10b, 10c and respectively multiplied by coefficients A11, A12, A13. Then, the results of multiplication in the multipliers 10a, 10b are input to an adder 11a and added together. The result of multiplication in the multiplier 10c and the result of addition in the adder 11a are added together in an adder 11b and the result of addition thereof is output as c data. Likewise, m data is output from an adder 11d according to RGB data items input to multipliers 10d, 10e, 10f, and y data is output from an adder 11f according to RGB data items input to multipliers 10g, 10h, 10i.

On the other hand, a UCR (under color removal) process is effected to reduce the amount of color materials at the time of color image formation.

By using the K (black) color material of an amount determined by the following equation (17), the amounts of respective color materials can be reduced by an amount corresponding to the amount of K color material as expressed by the following equations (18).

$$K=\text{MIN}\,(y, m, c) \quad (17)$$

MIN: functional operation for deriving the minimum value.

$$Y=y-K$$
$$M=m-K \quad (18)$$
$$C=c-K$$

FIG. 3 shows the construction of a circuit corresponding to the equations (17) and (18). The c data and m data are compared by a comparator 12a and a signal (which is "0" when c is smaller, for example) indicating the result of comparison is output to a selector 13a. The selector 13a is supplied with c data and m data at the input ports P0 and P1 thereof, selects one (which is the data item input to the input port P0 when c is smaller, for example) of the data items input to the input ports according to a control signal (which is "0" when c is smaller, for example) from the comparator 12a and outputs the selected data item. The output result P data is expressed as follows.

$$P=\text{MIN}\,(c, m) \quad (19)$$

The P data and y data are input to a comparator 12b, and a control signal indicating the result of comparison, the P data and y data are input to a selector 13b to derive K data expressed by the equations (18).

Further, the y data and K data are input to a subtracter 14a in which K is subtracted from y to derive Y data. Likewise, M data is derived from a subtracter 14b based on the m data and K data, and C data is derived from a subtracter 14c based on the c data and K data.

Next, the consumption calculating section 4 is explained in detail with reference to FIG. 4. Y data is input to an adder 15a together with an output of a register 16a, the values thereof are added together and the result of addition is output to the register 16a. The content of the register 16a is cleared to "0" when the color image reading section 1 starts to read a color image of one picture plane, accumulates Y data items of the image of one picture plane, and outputs accumulated data $\Sigma Y$ when reading of the color image of one picture plane is terminated. Likewise, the accumulated values $\Sigma M$, $\Sigma C$, $\Sigma K$ for M data items, C data items, K data items are respectively output from the registers 16b, 16c, 16d.

If the color image recording section 3 makes a hard copy of color image of A 3 size with 400 dpi, the maximum data amount is determined as follows.

$$8\times297\times420\times(400/25.4)^2=2.5\times10^8$$

Therefore, it is sufficient if each of the registers 16a, 16b, 16c, 16d has a capacity of 28 bits, but $\Sigma Y$, $\Sigma M$, $\Sigma C$, $\Sigma K$ which cause no problem from the statistical viewpoint can be obtained by inputting data items once for every n pixels to reduce the amount of data items to 1/n times the original amount and multiplying the outputs of the registers 16b, 16c, 16d by n instead of successively inputting data items for all of the pixels to the adders 15a, 15b, 15c, 15d.

Next, the charge value calculating section 5 is explained in detail with reference to FIG. 19.

The charge value calculating section is supplied with four values of $\Sigma Y$, $\Sigma M$, $\Sigma C$, $\Sigma K$ from the consumption calculating section. The values of $\Sigma Y$ and $\Sigma M$ are input to an adder 501, the result of addition ($\Sigma Y+\Sigma M$) is input to an adder 502 together with the value of $\Sigma C$ and added with the value of $\Sigma C$, and the value of ($\Sigma Y+\Sigma M+\Sigma C$) is output. The output value ($\Sigma Y+\Sigma M+\Sigma C$) is input to a comparator 512 which is also supplied with the value of $\Sigma K$ at the other input terminal. Also, $\Sigma K$ is input to a comparator 513 which is supplied with a threshold value T2 at the other input terminal. An output signal CONT0 of an AND element 524 is set as follows.

Signal CONT0:

when $\Sigma Y+\Sigma M+\Sigma C<\Sigma K$ and $\Sigma K\geq T2$, the output signal is set to "0", and when $\Sigma K<T2$, the output signal is set to "1".

That is, CONT0 indicates a case wherein the printing is effected for substantially a monochromatic original and the consumption of the recording material is small. An output signal CONT1 of an AND element 523 is set as follows.

Signal CONT1:

when $\Sigma Y+\Sigma M+\Sigma C\geq\Sigma K$, the output signal is set to "0", and when $\Sigma Y+\Sigma M+\Sigma C<\Sigma K$ and $\Sigma K\geq T2$, the output signal is set to "1".

Further, the values of ($\Sigma Y+\Sigma M+\Sigma C$) and $\Sigma K$ are input to and added together by an adder 503, the added value ($\Sigma Y+\Sigma M+\Sigma C+\Sigma K$) is output and input to a comparator 511. A predetermined threshold value T is input to the comparator 511 as the other input. An output signal of the comparator 511 is set as follows.

When $\Sigma Y+\Sigma M+\Sigma C+\Sigma K\geq T$, the output signal is set to "0", and when $\Sigma Y+\Sigma M+\Sigma C+\Sigma K<T$, the output signal is set to "1".

The output signal of the comparator 512 and an output signal (signal CONT1) of a comparator 512 are logically inverted and then input to an AND element 521. Therefore, an output signal of the AND element 521 is set as follows.

Signal CONT3:

when $\Sigma Y+\Sigma M+\Sigma C\geq\Sigma K$ and $\Sigma Y+\Sigma M+\Sigma C+\Sigma K<T$, the output signal is set to "0", and when $\Sigma Y+\Sigma M+\Sigma C+\Sigma K\geq T$, the output signal is set to "1".

The logically inverted form of the output signal of the comparator 512 and the output signal of the comparator 511 are input to an AND element 522. Therefore, an output signal of the AND element 522 is set as follows.

Signal CONT2:

when $\Sigma Y+\Sigma M+\Sigma C \geq \Sigma K$ and $\Sigma Y+\Sigma M+\Sigma C+\Sigma K \geq T$, the output signal is set to "0", and when $\Sigma Y+\Sigma M+\Sigma C+\Sigma K<T$, the output signal is set to "1".

Figure 20:
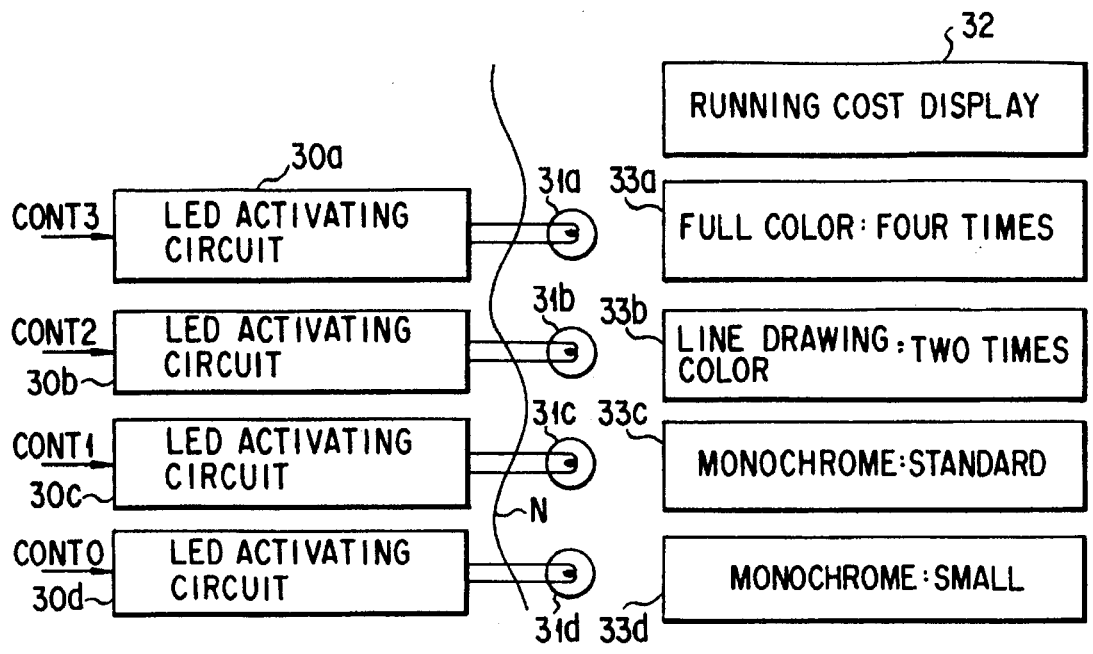
FIG. 20 is a block diagram schematically showing the construction of a display in the fifth embodiment.

Next, the display section 6 is explained. A control panel for permitting the user to input operation instructions is provided on the front portion of the image forming apparatus of this invention and the display section 6 shown in FIG. 20 is disposed on part of the control panel. The display section 6 is supplied with four signals of CONT3, CONT2, CONT1, CONT0 from the charge value calculating section 5. The respective signals are input to LED activating circuits 30a, 30b, 30c, 30d and only when the input signal is set at the "1" level, a corresponding one of the LED activating circuits activates a corresponding LED 31a, 31b, 31c or 31d. A portion on the right side of the wave line N indicates the display on the control panel, and stickers 33a, 33b, 33c, 33d on which messages shown in the drawing are printed are respectively attached beside the LEDs 31a, 31b, 31c, 31d and a sticker 32 is attached on the upper side of the above stickers.

In this case, an example of LED display is used, but the display may be a liquid crystal panel type display to display the messages of the stickers 33a, 33b, 33c, 33d.

Next, the copy counter 7 is explained. FIG. 21 shows the construction of the copy counter 7. The signals CONT3, CONT2, CONT1, CONT0 from the charge value calculating section 5 are input to a register 40. As shown in FIG. 22, the register has a 4-bit structure, the signals CONT3, CONT2, CONT1, CONT0 are respectively assigned to the high order bit, intermediate order bit, low order bit and last bit, and it outputs an output of "4" when the signal CONT3 is input, outputs an output of "2" when the signal CONT2 is input, outputs an output of "1" when the signal CONT1 is input, and outputs an output of "0" when the signal CONT0 is input. The output of the register and a signal read out from a nonvolatile type electrically rewritable EEPROM 42 are input to an adder 41 and added together, and the result of addition is stored into the EEPROM 42 as an accumulated value. Then, the accumulated value is input to and displayed on a liquid crystal display 43.

Figure 9:
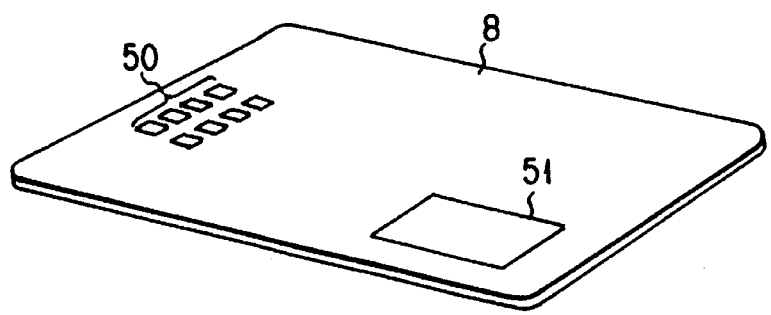
FIG. 9 is a perspective view showing the external appearance of a key counter.

Next, the key counter 8 is explained. The key counter 8 is constructed in the form of IC card and can be removably set on the apparatus. The construction thereof is shown in FIG. 9. The signals CONT3, CONT2, CONT1, CONT0 from the charge value calculating section 5 are input to a CPU 53 via a terminal section 50 and interface section 52. The terminal section 50 is also used as a power supply contact for power supply from the image forming apparatus 10 to the key counter 8. The CPU 53 adds an addition value corresponding to the signals CONT3, CONT2, CONT1, CONT0 to an old accumulated value read out from the EEPROM 42 and writes a thus obtained new accumulated value into the EEPROM 42. Further, a numeral pattern corresponding to the new accumulated value is read out from patterns previously stored in a PROM 54 and is displayed on the display of liquid crystal panel. As is seen from the appearance of the key counter 8 shown in FIG. 9, the terminal section 50 and display 51 are exposed to the surface of the package of the key counter 8.

In this example, no power source is provided on the key counter 8, but a battery may be provided in the key counter 8, and as is explained in the case of the copy counter 7, a mechanical rotation type counter can be substituted.

Figure 33:
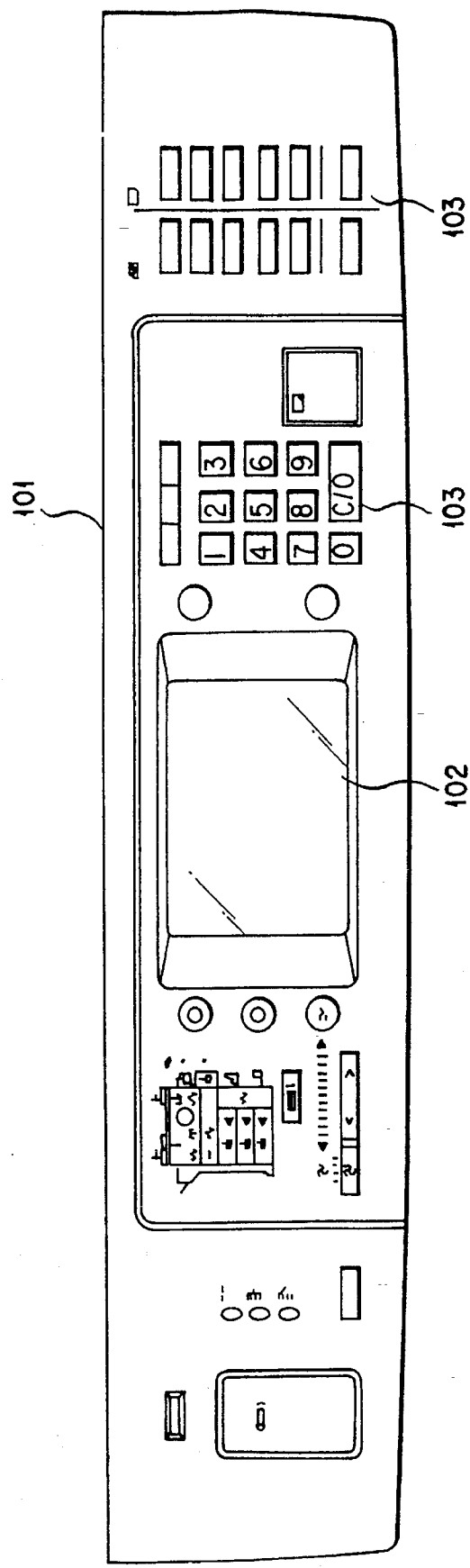
FIG. 33 is a view showing a control panel of an image forming apparatus according to one embodiment of this invention.
Figure 34:
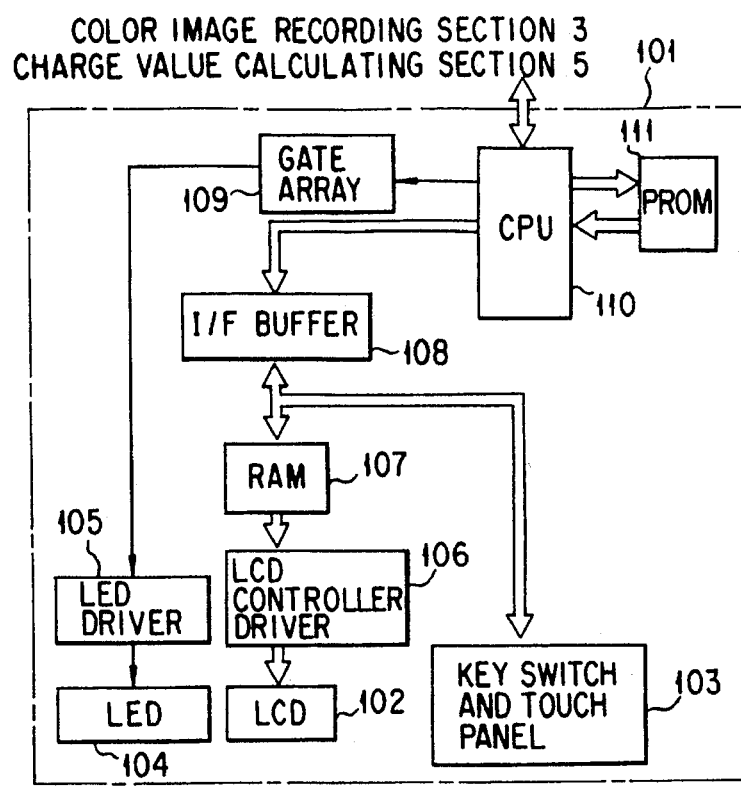
FIG. 34 is a block diagram showing the control panel of FIG. 33.

FIG. 33 is a view showing a control panel of an image forming apparatus according to one embodiment of this invention, and FIG. 34 is a block diagram of the control panel of FIG. 33. As one modification of this invention, it is possible to display the charge value as one display mode of a liquid crystal display 102 of a control panel 101 included in the color image recording section 3 without using a display section 6 (FIG. 1) exclusively used as the display section for the charge value. In this case, it is also possible to display a copy counter and a key counter without using an exclusive copy counter and key counter as the copy counter 7 and key counter 8.

For example, the control panel 101 includes a CPU 110 exclusively used for a panel, PROM 111, gate array 109, I/F buffer 108, RAM 107, LCD controller driver 106, LCD 102, LED driver 105, LED 104, key switch 103 and touch panel 102.

With the above construction, the CPU exclusively used for the control panel receives an instruction given by the operator via the touch panel 102, key switch 103 and transfers the instruction information to the color image recording section 3. Then, the color image recording operation is effected.

Further, the charge value from the charge value calculating section 5, copy counter value and key counter value are supplied to the LCD 102 via the exclusive CPU 110 and displayed on the LCD.

Figure 23:
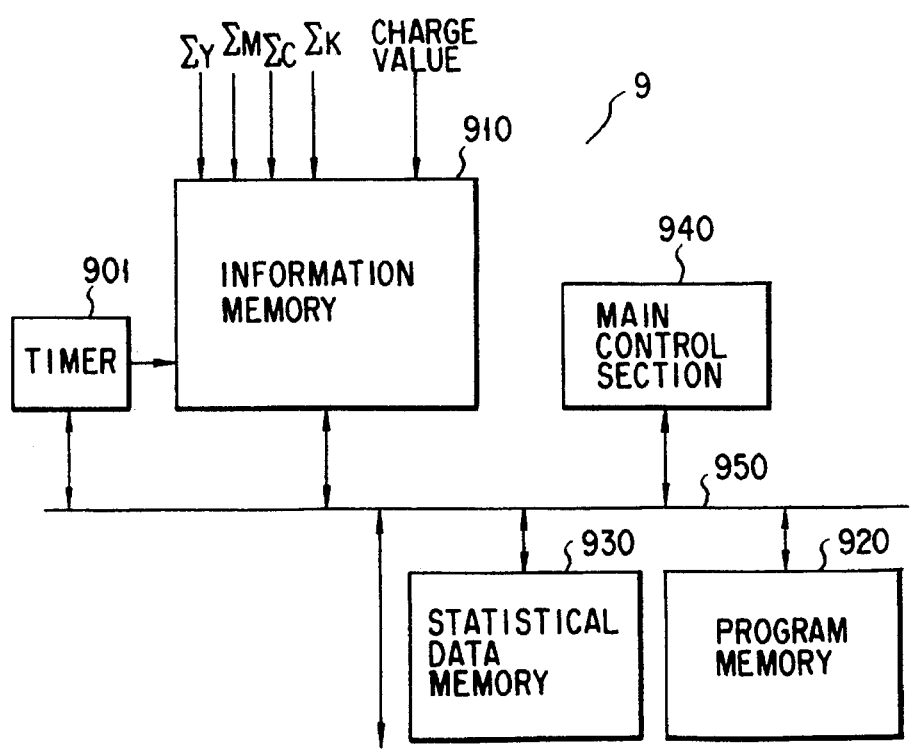
FIG. 23 is a block diagram showing the construction of a statistical processing section.

Next, the statistical processing section 9 shown in FIG. 23 is explained. The statistical processing section 9 is supplied with the values of $\Sigma T$, $\Sigma M$, $\Sigma C$, $\Sigma K$ from the consumption calculating section 4 and a signal of charge value from the charge value calculating section. The above values are stored into an information memory 910 constructed by an EEPROM together with an output value of a timer 901. A main control section 940 is mainly constructed by a microcomputer and a peripheral circuit thereof and is operated according to a program stored in a program memory 920 constructed by a nonvolatile memory. A statistical data memory 930 is constructed by a rewritable EEPROM for storing data indicating the result of process effected by the main control section 940 according to the statistical processing program of the program memory 950 based on data stored in the information memory 910. The information memory 910, program memory 920, statistical data memory 930, and timer 901 are connected to the main control section 940 via a data bus 950. Further, the data bus is also connected to a communication unit 108.

The communication unit 61 shown in FIG. 24 is explained. A communication control section 1081 of the communication unit 61 is connected to the main control section 940 of the information storing/processing unit to transfer data and control signals via the data bus 950. Further, the communication unit 1081 is connected to a timer 1082, pattern generator 1083 and communication interface 1084 of the communication unit 61. The communication interface 1084 is connected to a modulator/demodulator 1085. The modulator/demodulator 1085 modulates various data items transmitted from the communication interface 1084 and other information into an audio signal of data format suitable for transfer, demodulates data received via a network control section 1086 according to the transmission format, and transmits the data to the communication control section 1081 via the communication interface 1084. The network control section 1086 effects the switching between a mode in which the circuit is used for telephone communication and a mode in which the circuit is used for data communication, detection of call incoming signal, automatic dialing and the like. The timer 1082 effects the time counting operation necessary for various processes effected by the communication control section 1081, has a time counting function for communication, and is used when the process of communicating various data and information at the set time, for example, in the middle of the night in which the circuit is not used for telephone communication. The pattern generator 1083 receives code data from the communication control section 1081, converts the received data into a character pattern which is corresponding image data, and outputs the character pattern to the communication interface 1084. Thus, it becomes possible to cope with a case wherein the data transfer destination is a device such as a facsimile device dealing with image data.

The external device 62 shown in FIG. 25 is explained. The external device 62 is basically constructed by a network control section 1092, modulator/demodulator 1093, and processing device 1094. The modulator/demodulator 1093 supplies data received from the public communication line 63 via the control section 1092 to a control device 1094-1 which in turn causes a display device 1094-2 such as a CRT display to display the data on the display device, causes a printing device 1094-3 such as a printer to print the data, or stores the data into a storage device 1094-4 such as a floppy disk. Further, the processing device 1094 includes an input device 1094-5 such as a keyboard and can make a request for transfer of various data from the external device 62 to the communication unit 61, for example.

Next, the operation of the image forming apparatus with the above construction is explained with reference to FIG. 26.

When an original is set on the color image reading section 1 and a copy operation starting switch (not shown) is depressed, the registers 16a, 16b, 16c, 16d of FIG. 4 and the register 40 of FIG. 22 are reset and the values held therein are all reset to "0" (S51).

Next, 8-bit digital data items of R, G, B of a certain unit pixel are input to the color converting section 2 from the color image reading section 1 (S52). As shown in FIG. 2, in the color converting section 2, 8-bit data items of RGB are first converted into 8-bit data items of cmy, and as shown in FIG. 3, they are in turn converted into 8-bit data items of the second color data items YMCK which are output to the color image recording section 3 and consumption calculating section 4 (S53).

The 8-bit data items for respective YMCK supplied to the color image recording section 3 are used as data for forming one color image dot on a recording medium such as paper (S54). On the other hand, as shown in FIG. 4, the 8-bit data items for respective YMCK supplied to the consumption calculating section 4 are respectively added to the values held in the registers 16a, 16b, 16c, 16d by the adders 15a, 15b, 15c, 15d and the results of addition are respectively stored into the registers 16a, 16b, 16c, 16d (S55).

The above operation is effected for all of the unit pixels output from the color image reading section 1, and the process is repeatedly returned to the step S2 and the process for 8-bit data items of respective RGB of a next unit pixel is effected until the operation of the image reading device for reading the image of one picture plane of A3 size, for example, is completed (S56).

If the operation of reading the image of one picture plane by the color image reading device is completed, the values of $\Sigma Y$, $\Sigma M$, $\Sigma C$, $\Sigma K$ are output from the consumption calculating section 4 to the charge value calculating section (S57). As shown in FIG. 19, in the charge value calculating section, the values of $\Sigma Y$, $\Sigma M$, $\Sigma C$, $\Sigma K$ are sequentially added together by the adders 501, 502, the result of addition $(\Sigma Y+\Sigma M+\Sigma C)$ is compared with the value of $\Sigma K$ by the comparator 512, the result of addition $(\Sigma Y+\Sigma M+\Sigma C+\Sigma K)$ is compared with the threshold value T by the comparator 511, the results of comparison are logically processed by the logic elements 521, 522, and then signals are output to the output terminals CONT1, CONT2, CONT3. The combinations of the signals CONT0, CONT1, CONT2, CONT3 can be set to correspond to the types of originals and input signals as follows.

A) In a case wherein a monochromatic original or an original which contains little color and is similar to a monochromatic original is used and the consumption is small, $(\Sigma Y+\Sigma M+\Sigma C) \leq \Sigma K$ and $\Sigma K \geq T2$, and as a result, CONT0=1, CONT1=0, CONT2=0 and CONT3=0.

B) In a case wherein a monochromatic original or an original which contains little color and is similar to a monochromatic original is used and a certain amount of toners is consumed, $(\Sigma Y+\Sigma M+\Sigma C) \leq \Sigma K$ and $\Sigma K>T2$, and as a result, CONT0=0, CONT1=1, CONT2=0 and CONT3=0.

C) In the case of a color original which has various colors but mainly contains line patterns and letters having small recording areas, $(\Sigma Y+\Sigma M+\Sigma C)>\Sigma K$ and $(\Sigma Y+\Sigma M+\Sigma C) \leq T$, and as a result, CONT0=0, CONT1=0, CONT2=1, and CONT3=0.

D) In the case of a full color original such as a natural picture which has various colors and has a large recording area, $(\Sigma Y+\Sigma M+\Sigma C)>\Sigma K$ and $(\Sigma Y+\Sigma M+\Sigma C)>T$, and as a result, CONT0=0, CONT1=0, CONT2=0, and CONT3=1.

The signals CONT0, CONT1, CONT2, CONT3 are output from the charge value calculating section 5 to the display section 6 disposed on the user's control panel (not shown), the copy counter 7 provided for the person in charge of service maintenance and set inside the main body of the image forming apparatus, and the key counter 8 inserted into the image forming apparatus by the user when it is used (S58).

When the signals are input from CONT0, CONT1, CONT2, CONT3 to the display section 6, the LED activating circuits 30a, 30b, 30c, 30d are driven as shown in FIG. 20 and one of the LEDs 31a, 31b, 31c, 31d corresponding to CONT0, CONT1, CONT2 or CONT3 is activated. On the side portion of the LED group, the label 32 of "running cost display", the label 33a of "full color:four times", the label 33b of "line drawing color:two times", the label 33c of "monochrome:standard", and the label 33d of "monochrome:small" are attached, and the LED 31a which lies beside the label 33a of "full color:four times" is activated in the case of A), the LED 31b which lies beside the label 33b of "line drawing color: two times" is activated in the case of B), the LED 31c which lies beside the label 33c of "monochrome: standard" is activated in the case of C), and the LED 31d which lies beside the label 33d of "monochrome: small" is activated in the case of D) so as to indicate to the user that an original set on the image reading section 1 corresponds to the type indicated by the message and a corresponding charge amount is charged (S59). In the copy counter 7, the signals of CONT0, CONT1, CONT2, CONT3 are input to the register 40, and one of the charge values "4", "2", "1", "0" corresponding to the cases A), B), C), D) is output. The charge value is added to the charge value accumulated so far and stored in the EEPROM 42 by the adder 41, and the result of addition is stored as an updated value. Further, the value stored in the EEPROM 42 is displayed on the liquid crystal display 43 so that the person in charge of service maintenance can visually confirm the charge value when he demands the payment from the user (S60). On the other hand, in the key counter 8, the CPU 53 fetches the signals of CONT0, CONT1, CONT2, CONT3 from the charge value calculating section via the terminal section 50 and interface section 52 according to the program stored in the PROM 54, the value thereof is added to the value already stored in the EEPROM 42, and the result of addition is stored into the EEPROM 42. Further, the stored value is displayed on the display 51 (S61).

The values of ΣY, ΣM, ΣC, ΣK from the consumption calculating section 4 and the charge value from the charge value calculating section 5 are input to the statistical processing section 9 and stored into the information memory 910 together with output data indicating year/month/date/ hour/minute/second of the timer 901.

Figures 29, 32:
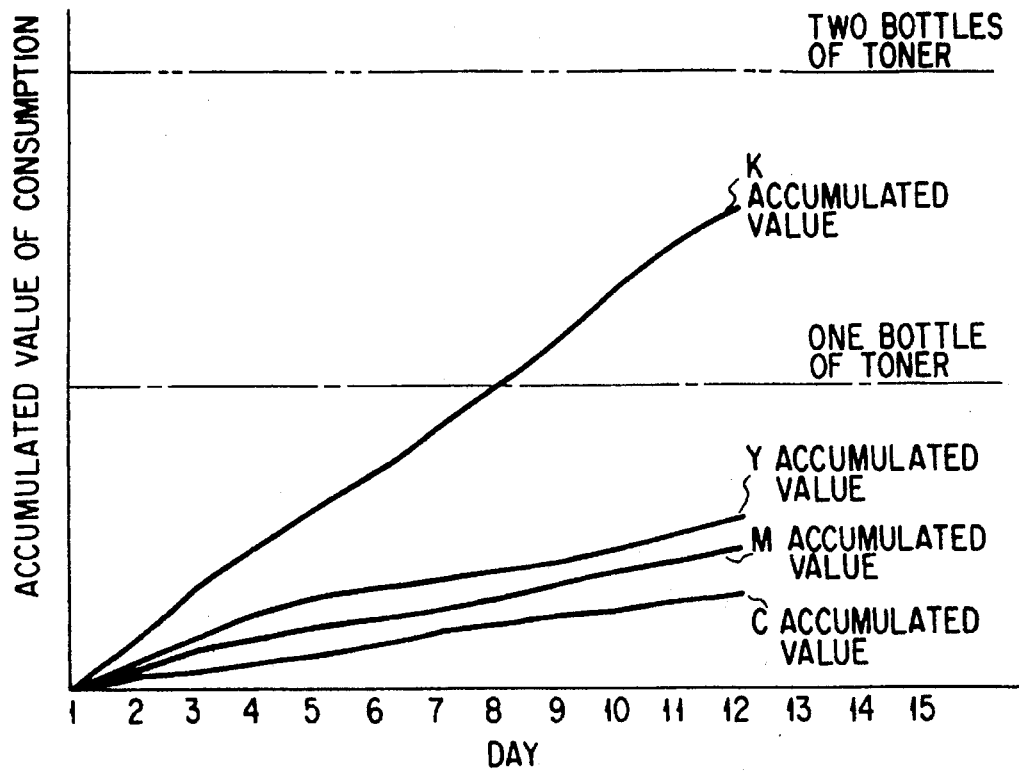
FIG. 29 is a graph showing a third output example of the external device.
FIG. 32 is a table showing the information storing format of an information memory of an information storage/processing section.

FIG. 32 shows one example of the storing format and, for example, on the row of data number 132, values of 100, 60, 40, 30 of ΣY, ΣM, ΣC, ΣK and the charge value 4 are stored in connection with time information of 95/09/30/16/54/57.

The main control section 940 subjects data of the information memory 910 to the statistical process according to the statistical processing program stored in the program memory 920 and sequentially stores the thus processed data into the statistical data memory 930. The accumulated value of various information items can be obtained by the following equation as one of the statistical processes.

$$\text{Accumulated value} = \sum_{i=A}^{B} (X) \quad (20)$$

where i indicates the data number stored in the information memory, A indicates the minimum value 1 of the data numbers, B indicates the maximum value of the data numbers or the newest data number, and the accumulated value of all of the data items stored in the information memory can be derived. The information data is used as information data corresponding to the maintenance cycle if the service man accesses the memory at the time of maintenance, for example. In this case, the accumulated values of consumptions of consumable toners, that is, the Y accumulated value, M accumulated value, C accumulated value and K accumulated value can be derived by replacing the term (X) in the equation (20) by ΣY, ΣM, ΣC, ΣK, and the accumulated value of the charge values can be derived by replacing the term (X) in the equation (20) by the charge value stored in the information memory 910.

As another type of statistical amount, an accumulated value for each constant time can be derived. For example, the third term of the time information stored in the information memory 910 is considered. The accumulated values of consumable toners consumed on the same day or the accumulated value of the charge values on the same day can be derived by accumulating ΣY, ΣM, ΣC, ΣK or the charge value corresponding to the data number i for successive data items having the same value in the third term. For example, in FIG. 32, if successive data items having the same number of "30" in the third term of the time information are detected, the data numbers 129 to 132 correspond to the successive data items and the accumulated value of the charge values on the day will be 2+2+4+4=12, for example. Likewise, when the fourth term of the time information is considered, the accumulated value for each hour can be obtained, and when the second term of the time information is considered, the accumulated value for each month can be obtained. Further, if the accumulated values are separately derived for cases wherein the value of the fourth term is larger or smaller than 12 in the time information having the same value in the third term, the accumulated values for the forenoon and afternoon can be obtained.

Further, the number of copies for each constant time can be derived for the respective types of originals. When time information items of data numbers 129 and 130 are considered, the difference therebetween lies only in a portion corresponding to the sixth term of "second" and the amounts ΣY, ΣM, ΣC, ΣK of the consumed toners and the charge value have the same values. This means that the data numbers 129 and 130 correspond to successive copies for the same original, and thus the data number corresponds to each copy. Therefore, the number of copies can be counted by counting the number of data items for each charge value for each day indicated by the third term of the time information. For example, when the number of data items for each charge value is counted for successive data items 129 to 132 having a numeral of "30" in the third term of the time information of FIG. 32, the number of copies made on Sep. 30, 1995 is counted for respective charge values corresponding to the respective types of originals in such a manner that no case is counted for the charge value "1", two cases of data numbers 129 and 130 are counted for the charge value "2", and two cases of data numbers 131 and 132 are counted for the charge value "4".

Further, as a different statistical amount, it is possible to derive an average value. The average value can be derived by dividing the accumulated value of the respective types by the data number.

$$\text{Average Value} = \text{Accumulated Value}/(B-A) \quad (21)$$

The above statistical processes are effected in response to an output of the timer 901 by the main control section 940 for each constant time, for example, for each hour and data is rewritten and stored into the statistical data memory 930.

The communication unit 61 is triggered once for each constant time, for example, once a day in the middle of the night in which the communication charge is low by the built-in timer 1082 to receive data stored in the statistical data memory 930 via the communication interface 1084, modulate the data into an audio signal of data format suitable for transfer by the modulator/demodulator 1085, and transmit the signal to the public communication line 63 via the network control section. If the network control section detects that the transmission destination is a device such as a facsimile device dealing with image data, the audio signal may be converted into character data by the pattern generator 1083 and then output.

The audio signal is received via the network control section 1092 of the external device 62, converted into the original statistical data by the modulator/demodulator 1093 and then stored into the storage device 1094-4 such as a floppy disk of the processing device 1094. Further, it is possible to start the data transfer in response to a data request from the external device 62. In this case, a request signal from the processing device 1094 of the external device 62 is modulated into an audio signal by the modulator/demodulator 1093 and transmitted to the public communication line 63 via the network control section 1092. The communication unit 61 demodulates the audio signal transmitted from the public communication line 63 via the network control section 63 by the modulator/demodulator 1085 and activates the communication control section via the communication interface. The data transfer effected after this is the same as described above.

Various statistical data items stored in the processing device 1094 of the external device 62 are converted into a graphic form according to the data processing program of the processing device 1094 and then output to the display device 1094-2 such as a display and the printing device 1094-3 such as a printer.

A case wherein the number of copies for respective charge values for each month shown in FIG. 27 is indicated by a line graph is explained as the first output example. In this example, it is understood that the number of copies for the charge value "4" has an increasing tendency, that is, the number of copies for full color originals such as natural pictures increases. In the case of copy of full color, the amount of consumable materials used is large and the amount of toners scattered in the device increases, and therefore, it is preferable to increase the frequency of the service maintenance and it becomes possible to take an adequate measure before the user makes a claim. Further, it is possible to make a detail graph for each week and for each day in the format shown in FIG. 27, and in this case, it becomes possible to more precisely and rapidly take an adequate measure.

Further, data indicating the number of copies for each charge value for each month shown in FIG. 27 can be used as data for claiming payment of the copy cost from the user. The charge amount charged on the user is a value determined by adding four types of charge values for each month, and an account which the user will satisfactorily accept can be made by entering the number of copies for each of four different types of originals as the details of the charge. Further, since data on the charge amount for each month can be obtained, the service man can settle the account by use of the automatic drawing system of the bank account without visiting the user. Particularly, this is effective when the number of copies is small and the maintenance service is not necessary.

The number of copies for respective charge values for each day of the week shown in FIG. 28 can be indicated by a bar graph as the second output example. The graph can be used to check the operation day of the service maintenance. Since use of the copying machine by the user is interrupted during the operation of the service maintenance, it becomes necessary to select a day on which the frequency of use of the copying machine by the user is low. In the example of FIG. 28, it is understood that the copying machine is not used at all on Saturdays and Sundays and is less frequently used on Tuesdays and Thursdays. When comparing the Tuesday's case and the Thursday's case, the numbers of copies are the same, but the number of copies for the charge values "2" and "4" or for color originals is larger in the Thursday's case. In the so-called 4-rotation type electrophotographic recording color copying machine using one photosensitive drum to make a color image by four rotations of the drum, since time for color copying which is approximately four times longer than time for monochromatic copying is necessary, the operation time of the copying machine of the Thursday's case is longer than that of the Tuesday's case. Therefore, the Saturday, Sunday on which the copying machine is not used at all, the Tuesday on which the copying machine is less frequently used, and the Thursday on which the number of copies is small can be given as a candidate day for the service maintenance.

On the other hand, it is possible to take the maintenance timing satisfying the user's need into consideration. In the process of copying a monochromatic original or a color original mainly containing letters/line drawing, a requirement for tone is not so severe, but in the case of copying of a full color original such as a natural picture, much attention is frequently paid to the tone. In the example of FIG. 28, the copies of full color originals corresponding to the charge value "4" are concentrated on Fridays, and in order to attain color reproduction with high-fidelity on Fridays, it is preferable to effect the service maintenance on Thursdays. In this embodiment, the operation of one week for each day of the week is displayed, but it is also possible to display the operation of one month for each day or for each half day and determine the maintenance timing for each month.

The accumulated values of consumable materials for each day can be indicated by a line graph as the third output example as shown in FIG. 29. The data is useful for determining the time of supply of the consumable toners. The consumable toners are held in cartridges or bottles, and the operator or user will supply the toners at adequate timings, but since toners of four colors are used in the color copying machine, a plurality of four types of cartridges or bottles are always prepared. If even one of the toners runs short, the copying operation cannot be effected and it becomes necessary to call the service man. However, if a large number of cartridges or bottles are prepared, a large space is uselessly occupied. In the example of FIG. 29, two toner bottles are supplied as spares at the time of preceding maintenance, and it is understood that supply of K color toner must be supplied because the K accumulated value comes closer to the amount of toner of two bottles on the 12th day. Further, it can be predicted that the toner will be used up in two or three days if the toner is used at the same rate. The accumulated values of the other color toners can be used to determine whether or not the bottles of other toners must be supplied at the time of visit to the user.

Figure 35:
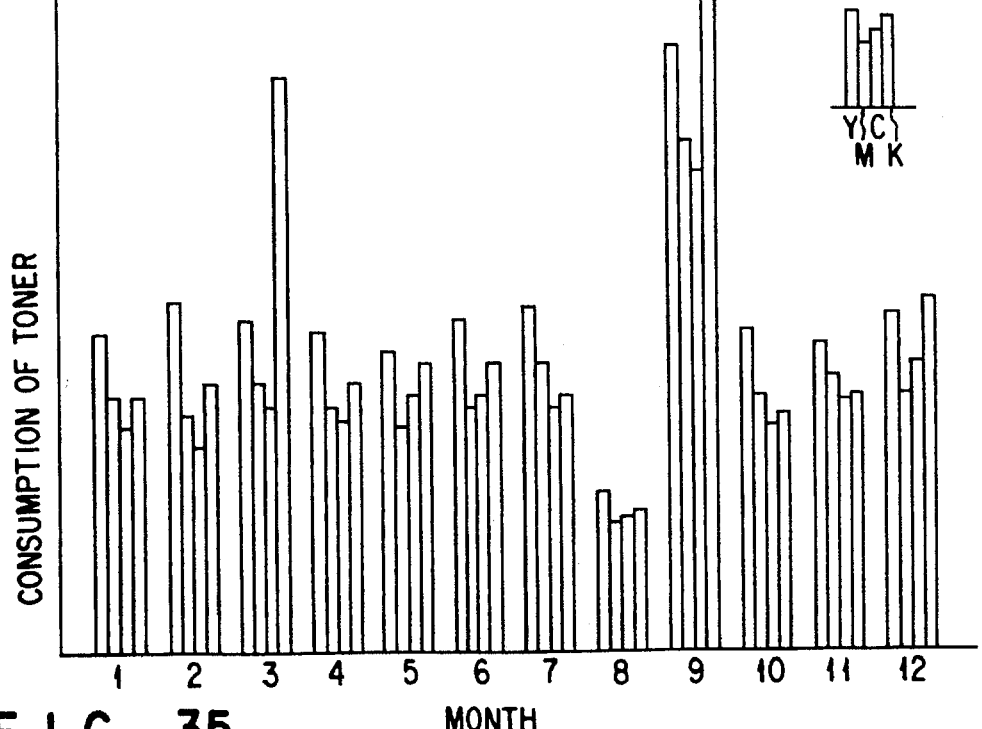
FIG. 35 is a histogram showing statistically showing the consumption of toner.

The consumptions of the toners of four colors for each month are indicated in FIG. 35 by a bar graph as the fourth output example. The graph can be used to predict the amount of toners to be supplied at the time of visit. In this example, since the consumptions of the four-color toners in August are approximately equal to or less than half those in the other months, supply of the toners can be controlled so as to reduce the number of cartridges or bottles of toner to half, for example, at the time of visit to the user before August. The consumption of K-color toner for copying monochromatic originals is increased in March and is approximately equal to twice the consumptions in the preceding and succeeding months, and this is considered because March is the end of the fiscal year. Therefore, it is possible to control supply of the toner so as to double the number of cartridges or bottles of K-color toner at the time of visit to the user before March. Likewise, in September, Y-color, M-color, C-color toner cartridges or bottles of a number equal to approximately two times those of the other months and K-color toner cartridges or bottles of a number equal to approximately three times those of the other months are previously supplied to prevent the amounts of toners from becoming excessive or insufficient. Therefore, the service maintenance can be more efficiently effected by forming the above graph.

Statistical data stored in the statistical data memory 930 of the statistical processing section 9 is used as data transferred via the public communication line 63 in this embodiment, but data items of the data number, time information, $\Sigma Y$, $\Sigma M$, $\Sigma C$, $\Sigma K$, charge value stored in the information memory may be used instead of the above data, and in this case, it is sufficient if the processing device 1094 has a construction which permits the statistical process effected in the information storing/processing section to be realized in the processing device 1094 of the external device 62, that is, a construction corresponding to the main control section 940 and program memory 920.

The embodiments described above can be modified and applied without departing from the technical scope thereof. For example, it is possible to indicate the charge value to the user before the hard copy forming operation is started and then start the operation after obtaining the user's consent, and the added value of the apparatus can be enhanced. This can be realized by the following modification.

Figure 26:
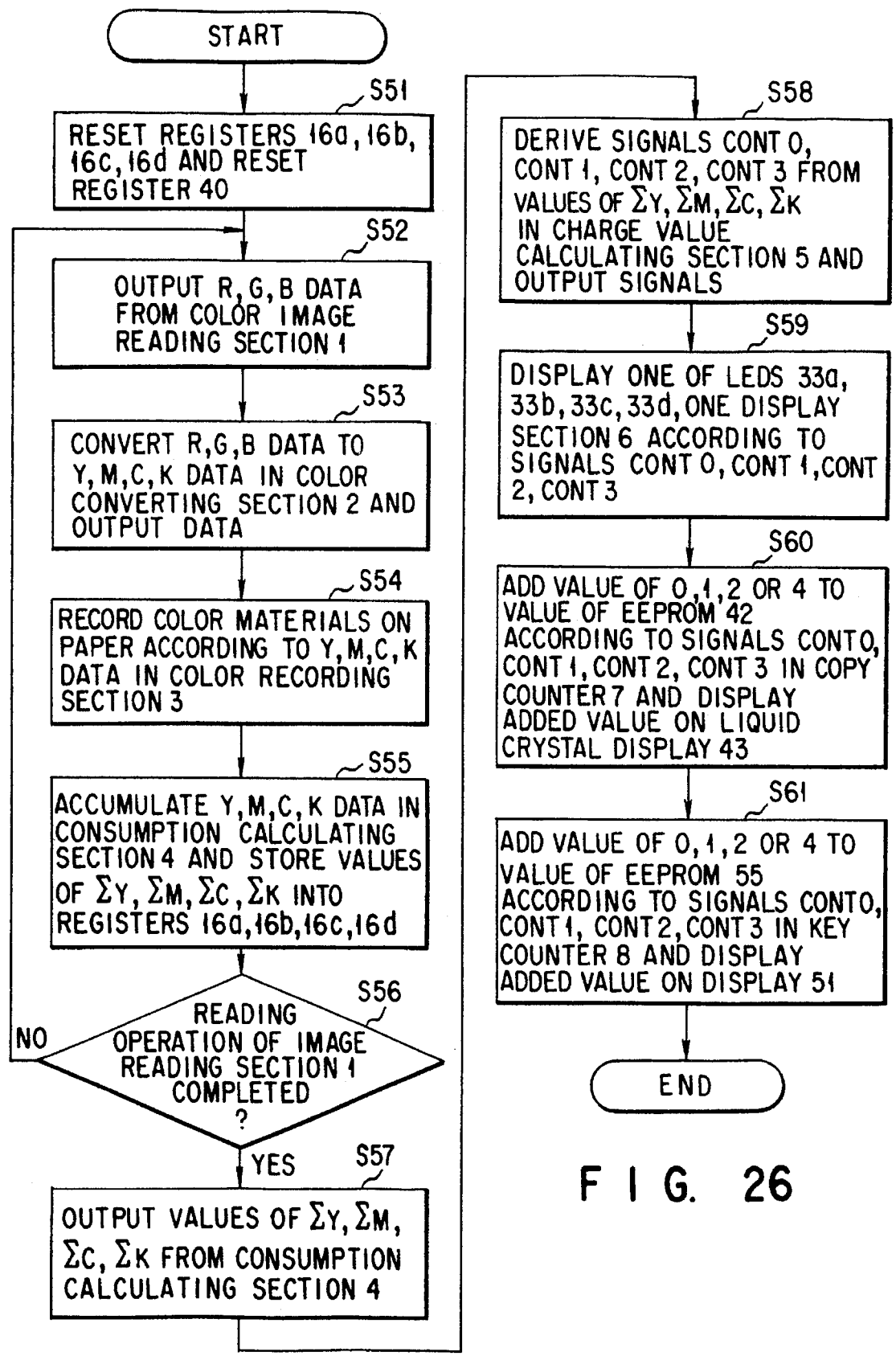
FIG. 26 is a flowchart for illustrating the operation process of a color image forming apparatus according to one embodiment of this invention.
Figure 31:
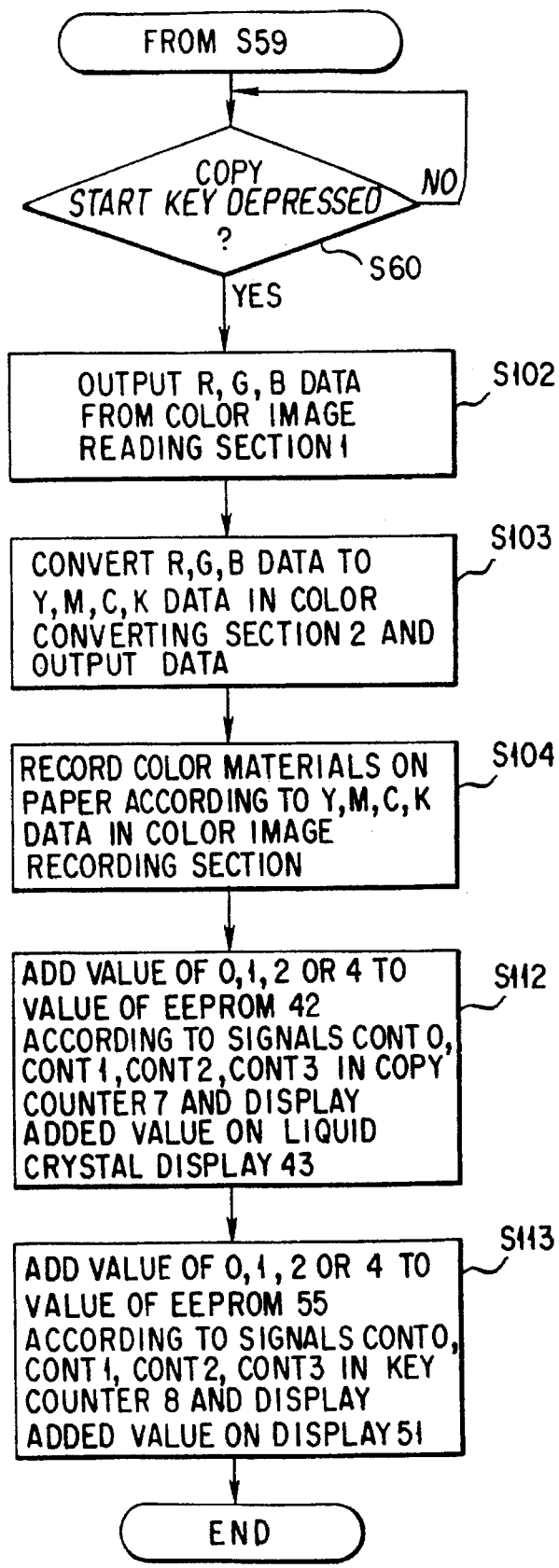
FIG. 31 is a flowchart for illustrating the auxiliary operation of the modification.

In the first embodiment of FIG. 26, the recording step (S54) in the color image recording section 3 is effected when the values of ΣY, ΣM, ΣC, ΣK are calculated for each pixel, but as shown in FIG. 30, in this modification, after the calculation for ΣY, ΣM, ΣC, ΣK is completed (S56, S57), the charge value is calculated (S58), and after the LED indicating the charge value is lit on the display section 6 on the control panel (S59), the operation of detecting that the copy start key is depressed by the user is additionally effected, and after detection of the depression (S60), the recording operation is effected (S60). By the above operation, the charge value is indicated to the user before the hard copy outputting operation is started and then the outputting operation is started after obtaining the user's consent. At this time, if means for storing color image data of one picture plane is provided in the image recording section 3, the step S61 can be instantly effected, but in the case of image recording section 3 having no such storing means, as shown in FIG. 31, color image data is received from the color image reading section 3 (S102) again and converted into Y, M, C, K data items (S103), and then recorded (S104), and thus the image reading operation at the time of calculation of the charge value is substantially equal to the pre-scanning effected without outputting the image.

As another modification, it is possible to freely set the charge value and select the practical setting method which can be easily accepted by the user.

In the first embodiment, the fixed rates "1", "2" and "4" set in the cases A), B) and C) are used for charging. However, in a so-called 4-series process electrophotographic recording device having four sets of operating means constructed by photosensitive bodies and developing units and used as the image recording device 3, it is considered that only the consumptions of toners which are color materials increase.

FIG. 36 is a table indicating the charge values in a case where the 4-rotation type color image forming apparatus of this invention is used. The consumed amounts of toners in four cases including a case (0) of "monochrome:small", a case (1) of "monochrome: standard", a case (2) of "color line drawing", and a case (3) of "full color" are studied. If the consumption of toner in the case (0) of "monochrome: small" is set to c and used as one unit, for example, a case wherein the toner consumption in the case (1) of "monochrome:standard" is set to twice the above value, the toner consumption in the case (2) of "color line drawing" is set to four times the above value, and the toner consumption in the case (3) of "full color" is set to 20 times the above value is shown in FIG. 36. If the service labor cost d, margin e are taken into consideration, for example, the charge value (0) in the case (0) of "monochrome:small" can be derived as (a+b+c+d+e). It should be noted here that the consumption (b) of the photosensitive portion in the monochrome recording case is small in comparison with the consumption (4b) in the color recording case in the 4-rotation type electrophotographic recording device. The charge value can be set by forming the display section 6 and copy counter 7 on the control panel with the same construction as the key counter 8, for example, and previously writing the above equation into the PROM 54, and solving the equation by use of the CPU 53.

The "photosensitive body and the like" include a photosensitive drum, developer, upper and lower heat rollers for fixing, cleaning blade, lead wire and the like which must be replaced at regular intervals and the costs thereof are determined by dividing the prices of the above parts by the respective service lives (replacing cycles) and accumulating the results of divisions, that is, Σ(prices of consumable parts/serviceable lives). Further, the "service labor cost" is a value obtained by expressing the labor cost of the service man required for overhaul and repair and periodic inspection including replacement of consumable parts in terms of the cost for each copy. Likewise, the "margin" is a value obtained by expressing the business profit in terms of the cost for each copy.

The above values can be changed for respective sales stores. The values (parameters) can be changed by inputting them by use of the keyboards 102, 103 of the control panel 101 if necessary.

Further, the parameters can be changed from the external device 62 via the public communication line 63 by use of the communication unit 61.

FIG. 37 is a table indicating the charge values obtained in a case wherein the 4-series color image forming apparatus of this invention is used. Like the 4-rotation type apparatus, the consumed amounts of toners in four cases including a case (0) of "monochrome:small", a case (1) of "monochrome: standard", a case (2) of "color line drawing", and a case (3) of "full color" is studied.

Unlike the case of the 4-rotation type apparatus, a case wherein the consumption of the photosensitive body for a monochromatic original is smaller is not present and the same cost is set for the consumption of the photosensitive bodies in the above four cases.

In the above examples, the cost for paper is included in the charge value, but when paper is sold separately, the charge value may be reduced by a corresponding amount a.

Further, as another modification, a method for effecting the operation of the consumption calculating section 4 after reducing the number of operations of the consumption calculating section 4 can be considered. This method is used to alleviate the processing speed and achieve the same purpose by the software process by use of the CPU since approximately determined values can be used as the amounts of consumable materials used for calculations of Y, M, C, K data items for each pixel required for image formation. In FIG. 4, the input data items Y, M, C, K are not necessarily provided for all of the pixels, and if samplings of approx. 100 are statistically sufficient for the data amount of approx. 4 Mbyte/color with the resolution of 400 dpi for an image of A3 size, it is possible to extract one pixel for every 40,000 pixels.

Further, in the embodiment of this invention, the charge value calculating section 5 is not necessarily required. That is, even if the charge value calculating section 5 is omitted, it is of course possible to provide an image forming apparatus capable of supplying data for enhancing the efficiency of the maintenance service, for example, by subjecting consumption data from the toner consumption calculating section 4 to the statistical process in the statistical processing section 9 and transferring the statistical data to the exterior.

As described above, according to this invention, it is possible to provide an image forming apparatus capable of realizing a data base which enhances the efficiency of the maintenance service and the like.

Further, it is possible to provide an image forming apparatus which has a high recording speed and can adequately set the charge value charged on the user according to the printing rate.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus for forming a duplicate image based on first color image data, comprising:
   means for fetching the first color image data subjected to color separation;
   means for converting the first color image data into second color image data;
   means for forming the duplicate image of the first color image data by using recording materials of different types based on the second color image data;
   means for calculating the consumptions of the respective recording materials used for image formation; and
   means for calculating a charge value for image formation of the duplicate image based on the consumption of the recording materials calculated by the consumption calculating means.

2. An image forming apparatus according to claim 1, wherein the consumption calculating means includes means for specifying one of a plurality of predetermined levels based on the consumption of the recording materials.

3. An image forming apparatus according to claim 1, wherein the consumption calculating means includes means for comparing the consumptions of color recording materials with the consumption of black recording material among the consumptions of the recording materials.

4. An image forming apparatus according to claim 1, wherein the consumption calculating means includes means for dividing the amounts of color element data items of the second color image data by a preset integer to derive the accumulated values of the color element data items.

5. An image forming apparatus according to claim 1, further comprising means for displaying the charge value for image formation of the duplicate image calculated by said charge value calculating means.

6. An image forming apparatus according to claim 1, wherein the image forming means includes means for inputting an instruction for image formation by the operation of an operator after the operator recognizes the charge value displayed on the display means; and means for effecting the control operation to inhibit the image forming operation by the image forming means until the instruction for image formation is input by the instruction inputting means and permit image formation by said image forming means after detecting the input of the instruction.

7. An image forming apparatus according to claim 1, further comprising means removably mounted on the image forming apparatus, for adding together a plurality of charge values calculated by the charge value calculating means and displaying the total sum of the charge values obtained as the result of addition.

8. An image forming apparatus according to claim 1, wherein the image data fetching means includes means for receiving the first color image data supplied from the communication network, storing the received first color image data, and supplying the first color image data to the converting means.

9. An image forming apparatus according to claim 1, wherein the consumption calculating means includes means for determining the charge value based on the consumption by use of an equation having parameters used for calculating the charge value for image formation by the image forming means; and means for changing the parameters of the equation by the operation effected from the exterior.

10. An image forming apparatus according to claim 1, wherein the consumption calculating means includes means for specifying one of a plurality of predetermined levels based on the consumptions of the recording materials; means operated by the operator, for inputting a plurality of numerals indicating charge values corresponding to the plurality of levels specified by the specifying means; and means for outputting one of the numerals input by the inputting means and corresponding to the level specified by the specifying means as the charge value.

11. An image forming apparatus according to claim 1, wherein the consumption calculating means includes means for specifying one of a plurality of predetermined levels based on the consumptions of the recording materials; means operated by the operator, for inputting a plurality of numerals indicating charge values corresponding to the plurality of levels specified by the specifying means; means for converting the first numeral input by the numeral inputting means to a plurality of second numerals given from the exterior via the communication line; and means for outputting one of the first numeral and second numeral according to the level specified by the specifying means as the charge value.

12. An image forming apparatus for forming a duplicate image based on first color image data, comprising:
   means for fetching the first color image data subjected to color separation;
   means for converting the first color image data into second color image data;
   means for forming a duplicate image of the first color image data by using recording materials of different types based on the second color image data;
   means for calculating the consumptions of the respective recording materials used for image formation;
   means for calculating a charge value for image formation of the duplicate image based on the consumptions of the recording materials calculated by the consumption calculating means; and
   means for transferring data generated from the image forming apparatus to an external device via a communication line.

13. An image forming apparatus according to claim 12, wherein the data transferring means includes means for subjecting the charge value to the statistical process and transferring the statistical result to the external device via the communication line.

14. An image forming apparatus according to claim 12, wherein the data transferring means includes means for specifying one of a plurality of predetermined levels based on the consumptions of the recording materials; and means for subjecting the number of image forming operations by the image forming means to the statistical process for each of the plurality of levels and transferring the statistical result to the external device via the communication line.

15. An image forming apparatus according to claim 12, wherein the data transferring means includes means for specifying one of a plurality of predetermined levels based on the consumptions of the recording materials; and means for subjecting the number of image forming operations by the image forming means to the statistical process for each level for each preset time and transferring the statistical result to the external device via the communication line.

16. An image forming apparatus for forming a duplicate image based on first color image data, comprising:
   means for fetching color image data subjected to color separation;
   means for forming a duplicate image of the color image data by using recording materials of different types based on the color image data;

means for calculating the consumptions of the respective recording materials used for image formation; and means for subjecting the consumptions of the recording materials calculated by the consumption calculating means to the statistical process and outputting the statistical result.

17. An image forming apparatus according to claim 16, further comprising means for displaying the statistical result of the consumption from the statistical result outputting means and data generated from the image forming apparatus.

18. An image forming apparatus according to claim 16, wherein the statistical result outputting means includes means for transferring the statistical result and data generated from the image forming apparatus to the external device via the communication line.

19. An image forming apparatus according to claim 16, wherein the statistical result outputting means includes means for subjecting the consumptions of the recording materials calculated by the consumption calculating means to the statistical process for each preset time and outputting the statistical result obtained for each preset time; and means for displaying the statistical result obtained for each preset time and data generated from the image forming apparatus.

20. An image forming apparatus according to claim 16, wherein the statistical result outputting means includes means for subjecting the consumptions of the recording materials calculated by the consumption calculating means to the statistical process for each preset time and outputting the statistical result obtained for each preset time; and means for transferring the statistical result obtained for each preset time and data generated from the image forming apparatus to the external device via the communication line.

21. An image forming apparatus according to claim 16, wherein the statistical result outputting means includes means for specifying one of a plurality of predetermined levels based on the consumptions of the recording materials; means for subjecting the consumptions of the recording materials calculated by the consumption calculating means to the statistical process for each preset time for each of the plurality of levels and outputting the statistical result; and means for displaying the statistical result and data generated from the image forming apparatus.

22. An image forming apparatus according to claim 16, wherein the statistical result outputting means includes means for specifying one of a plurality of predetermined levels based on the consumptions of the recording materials; means for subjecting the consumptions of the recording materials calculated by the consumption calculating means to the statistical process for each preset time for each of the plurality of levels and outputting the statistical result; and means for transferring the statistical result and data generated from the image forming apparatus to the external device via the communication line.

23. An image forming apparatus according to claim 12, wherein the charge value calculating means includes means for determining the charge value based on the consumption by use of an equation having parameters used for calculating the charge value for image formation by the image forming means; and means for changing the parameters of the equation by the operation from the exterior.

24. An image forming apparatus according to claim 16, wherein the image forming means includes means for converting the color image data to second color image data.

25. An image forming apparatus for forming a duplicate image based on color image data, comprising:

means for receiving the color image data;

means for forming a duplicate image of the color image data by using a plurality of recording materials based on the color image data received by the receiving means;

means for calculating the consumptions of the recording materials used by the image forming means;

means for calculating the charge value for image formation of the duplicate image based on the consumptions of the recording materials calculated by the consumption calculating means; and means for informing the user of the charge value calculated by the charge value calculating means.

26. An image forming apparatus according to claim 25, wherein the charge value calculating means includes means for specifying one of a plurality of predetermined levels based on the consumptions of the recording materials.

27. An image forming apparatus according to claim 25, wherein the statistical result outputting means includes means for specifying one of a plurality of predetermined levels based on the consumptions of the recording materials; and means for subjecting the consumptions of the recording materials calculated by the consumption calculating means to the statistical process for each preset time for each of the plurality of levels and outputting the statistical result.

28. An image forming apparatus according to claim 27, wherein the informing means includes means for displaying the statistical result and data generated from the image forming apparatus.

\* \* \* \* \*